United States Patent
Ohshima

(12) 
(10) Patent No.: US 6,685,566 B2
(45) Date of Patent: Feb. 3, 2004

(54) COMPOUND REALITY PRESENTATION APPARATUS, METHOD THEREFOR, AND STORAGE MEDIUM

(75) Inventor: Toshikazu Ohshima, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 52 days.

(21) Appl. No.: 09/812,675

(22) Filed: Mar. 21, 2001

(65) Prior Publication Data

US 2002/0037768 A1 Mar. 28, 2002

(30) Foreign Application Priority Data

Sep. 27, 2000 (JP) .......................... 2000-294790

(51) Int. Cl.$^7$ .......................... A63F 13/00; G06T 15/70
(52) U.S. Cl. .................. 463/32; 463/37; 345/8
(58) Field of Search .................. 463/31–34, 36, 463/37; 345/7–9

(56) References Cited

U.S. PATENT DOCUMENTS 6,278,418 B1 * 8/2001 Doi .............................. 345/7
6,411,266 B1 * 6/2002 Maguire, Jr. .................. 345/8

* cited by examiner

Primary Examiner—Andrew M. Dolinar
(74) Attorney, Agent, or Firm—Fitzpatrick, Cella, Harper & Scinto

(57) ABSTRACT

When S=0, and a user waves his or her hand five times or more from side to side (S1502), the head of a dolphin appears from the water, and the number L1 of times of status changes is increased by 1 (S1504). When the user waves his or her hand twice or more up and down (S1503), the dolphin jumps from the water, and the number L1 is increased by 1 (S1505). When S=1, and a user waves his or her hand three times or more from side to side, the dolphin disappears into the water, and the number L1 is increased by 1 (S1507). When S=2, and the dolphin jumps into the water, then S=0 (S1509). If S=3, and the dolphin disappears into the water, then S=0 (S1511). Then, it is determined whether or not L1≧3 (S1512). If yes, the process is passed to the communications level 2 (S1513).

12 Claims, 28 Drawing Sheets

FORWARD=−z DIRECTION
UPWARD=+y DIRECTION

FORWARD=−z DIRECTION
RIGHT=+x DIRECTION

FIG. 6

| MOTION NUMBER (601) | MOTION DATA ADDRESS (602) |
|---|---|
| 0 | 0X0010 |
| 1 | 0X005A |
| 2 | 0X010D |
| ⋮ | ⋮ |

| STATUS NUMBER S | MOTION NUMBER MT |
|---|---|
| ⋮ | ⋮ |
| 4 | 2, 4 |

FIG. 13

| GROUP NUMBER (1301) | SUB-NUMBER (1302) | SPEECH CONTENTS_DATA (1303) |
|---|---|---|
| 6 | 1 | DATA 1 OF LAUGHTER |
| 6 | 2 | DATA 2 OF LAUGHTER |
| 6 | 3 | DATA 3 OF LAUGHTER |
| 7 | 1 | DATA 1 OF COMPLAINT |
| 7 | 2 | DATA 2 OF COMPLAINT |
| 7 | 3 | DATA 3 OF COMPLAINT |
| 7 | 4 | DATA 4 OF COMPLAINT |
| ⋮ | ⋮ | ⋮ |

Group 6 rows: 1304
Group 7 rows: 1305

DOLPHIN JUMPING

ASSIGNING DOLPHIN TO USER C

COMPOUND REALITY PRESENTATION APPARATUS, METHOD THEREFOR, AND STORAGE MEDIUM

FIELD OF THE INVENTION

The present invention relates to a compound reality presentation apparatus and method for generating an image of a virtual object, superposing the image on real space, and presenting a user with the result and to storage medium.

BACKGROUND OF THE INVENTION

Recently, portable and installed game machines for keeping a virtual pet are commonly marketed. The virtual pet is formed by a program code executed in the game machine, and the data used for the program code. It seems to a user as if the virtual pet were autonomously moving, and moving in response to a message from the user when the program changes an image representing the virtual pet by a predetermined condition.

On the other hand, when the user inputs a message for the virtual pet, the user transmits any message (for example, giving a stroke, striking, speaking by inputting characters or with voice) to the virtual pet using a predetermined interface (for example, a pad type interface formed by a button, a lever, etc., a keyboard, voice input microphone, etc.) connected to the game machine.

For example, when a message indicating the movement of 'giving a stroke' is transmitted to the virtual pet using the pad type interface, for example, the cursor representing the user's hand is displayed on the screen of the display on which the virtual pet is displayed, the cursor is superposed on the virtual pet, and a predetermined button is pressed, thereby performing the movement of giving a strike to the virtual pet.

As a result, the virtual pet performs a predetermined movement (for example, to be pleased, to be angry, to bark, etc.) corresponding to an input message, and the user observes the response of the pet to the movement (inputting a message) the user performs on the virtual pet. Thus, the user can enjoy the virtual communications with his or her virtual pet.

However, when a message is transmitted to a pet in virtual space for communications, the device and the method for transmitting a message indirectly function, and find difficulty in recognizing the reality of the pet.

The present invention has been developed to solve the above mentioned problems, and aims at easily recognizing the reality of the virtual object by changing the internal status of the virtual object by a predetermined movement of a predetermined body part of the user.

SUMMARY OF THE INVENTION

To attain the purpose of the present invention, for example, the compound reality presentation apparatus according to the present invention has the following configuration. That is,
a compound reality presentation apparatus which generates an image of a virtual object, superposes the image on real space, and presents the result to a user, including:
measurement means for measuring the position and a posture of a predetermined portion of a body of a user;
detection means for detecting a predetermined movement of the predetermined portion of the body based on the measurement result of said measurement means;
change means for changing an internal status of the virtual object into another internal status based on the detection result of said detection means; and
presentation means for presenting a user with a picture of a virtual object based on the internal status.

Furthermore, the apparatus includes:
capture means for capturing a picture of real space; and
compound means for compounding a picture of the real space obtained by the capture means and the virtual object, and generating a compound picture.

The presentation means presents the user with a compound picture generated by said compound means contains the picture of the virtual object.

Furthermore, the compound reality presentation apparatus includes management means for managing the predetermined movement of the predetermined portion of the body associated with the information about the status change of the virtual object.

The change means changes the status of the virtual object by referring to the information, which is managed by the management means, about a status change of the virtual object corresponding to the predetermined movement by the predetermined portion of the body.

Furthermore, the apparatus includes contents storage means for storing the information about contents issued by the virtual object.

The change means selects information corresponding to a state of the virtual object from the information stored in the contents storage means when the status of the virtual object is changed.

To attain the purpose of the present invention, for example, the compound reality presentation apparatus according to the present invention has the following configuration. That is,
a compound reality presentation apparatus which provides virtual communications with a virtual creature by presenting a user with a picture of the virtual creature, whose visible status such as appearance, movement, etc. and/or internal status are determined by a plurality of status determination parameters, and/or a picture of environment of the virtual creature both of which are superimposed on real space or its picture, comprising:
measurement means for measuring a position and a posture of a predetermined portion of a body of a user;
detection means for detecting a movement of the predetermined portion of the body based on a measurement result of said measurement means;
status change means for changing a value of a predetermined parameter in the plurality of status determination parameters based on a detection result of said detection means;
picture generation means for generating a picture of the virtual creature based on the plurality of status determination parameters; and
presentation means for presenting a user with the picture of the virtual creature superposed on the real space or a picture of the real space.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows a table storing a motion number and the address at which a motion corresponding to the number is stored;

FIG. 13 shows the voice message contents table;

DETAILED DESCRIPTION OF THE PREFERRED EMBODIMENTS

Preferred embodiments of the present invention will now be described in detail in accordance with the accompanying drawings.

The preferred embodiments of the present invention are described below in detail by referring to the attached drawings.

[First Embodiment]

The compound reality presentation apparatus according to this embodiment defines a dolphin as a pet existing in virtual space, a user directly transmits a message to the dolphin by waving his or her hand, and a dolphin moving corresponding to the message is displayed as a virtual object image, thereby displaying the dolphin in compound reality space. That is, the user can experience compound reality.

In the examples described below, a 3-dimensional model of a dolphin in the virtual space is generated in the well-known method using a polygon. However, it is obvious that another method can be used. The data (each piece of polygon data, etc. forming the dolphin) of the model of the dolphin is stored in the memory (not shown in the attached drawings) in the pet status management unit 110 described later.

Figure 1:
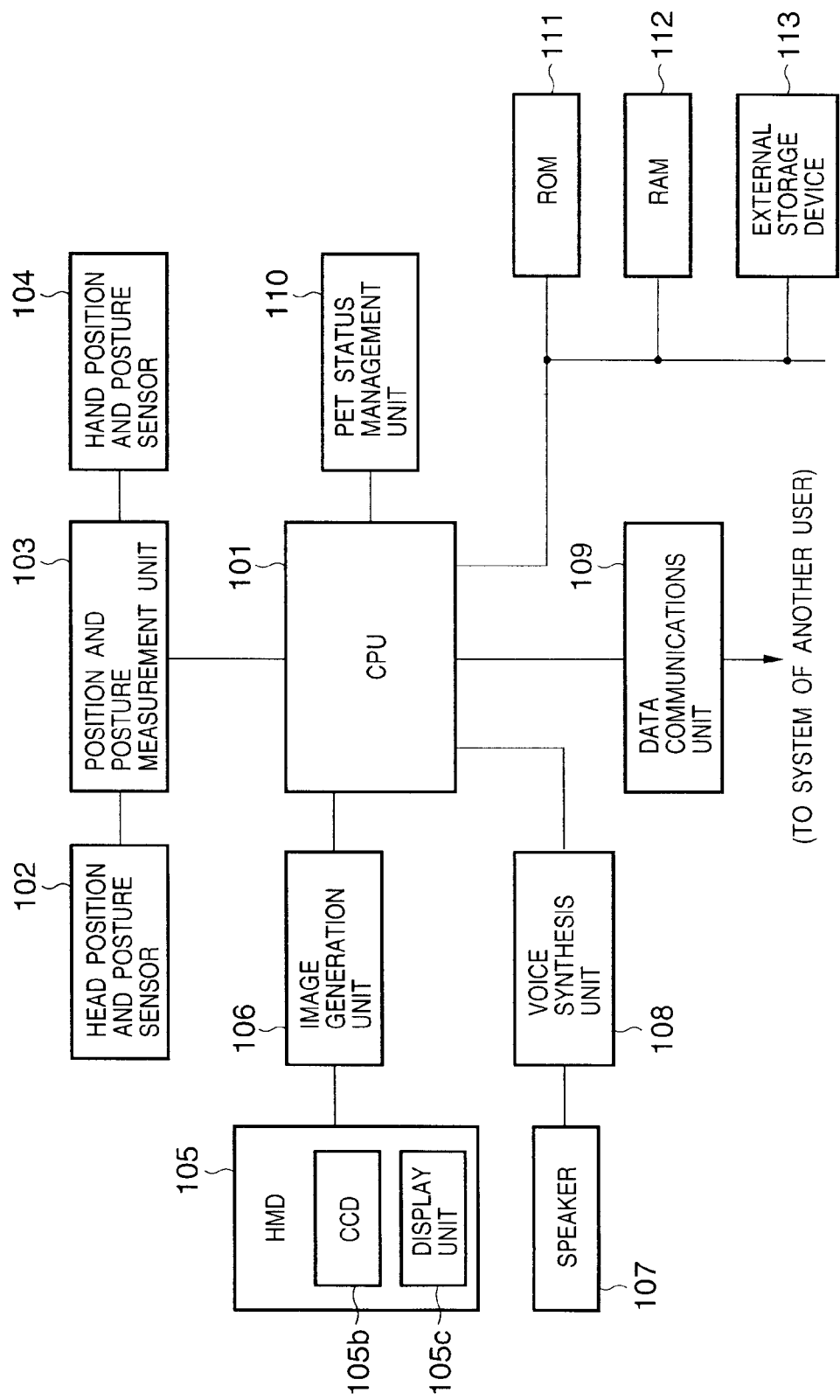
FIG. 1 is a block diagram of the rough internal configuration of the compound reality presentation apparatus according to the first embodiment of the present invention.

FIG. 1 is a block diagram of a rough internal configuration of the compound reality presentation apparatus according to this embodiment.

Reference numeral 101 denotes a CPU. The CPU 101 controls the entire apparatus using the data and program code stored in ROM 111, and performs various image processings described below, arithmetic operations, etc. using the data and program code stored in a memory (not shown) in a pet status management unit 110 described later or RAM 112. The location of each piece of data and program code is not limited to the application described above. For example, the control program code of the entire apparatus can be stored in an external storage device 113 and the RAM 112.

Reference numeral 102 denotes a head position and posture sensor. The head position and posture sensor 102 outputs a signal indicating the absolute position and posture (the position and posture of the head of the user in the absolute coordinate system) of the head of a user to a position and posture measurement unit 103 described below by attaching it to the head of the user. The above mentioned absolute coordinate system can be hereinafter referred to as a global coordinate system.

Figure 2:
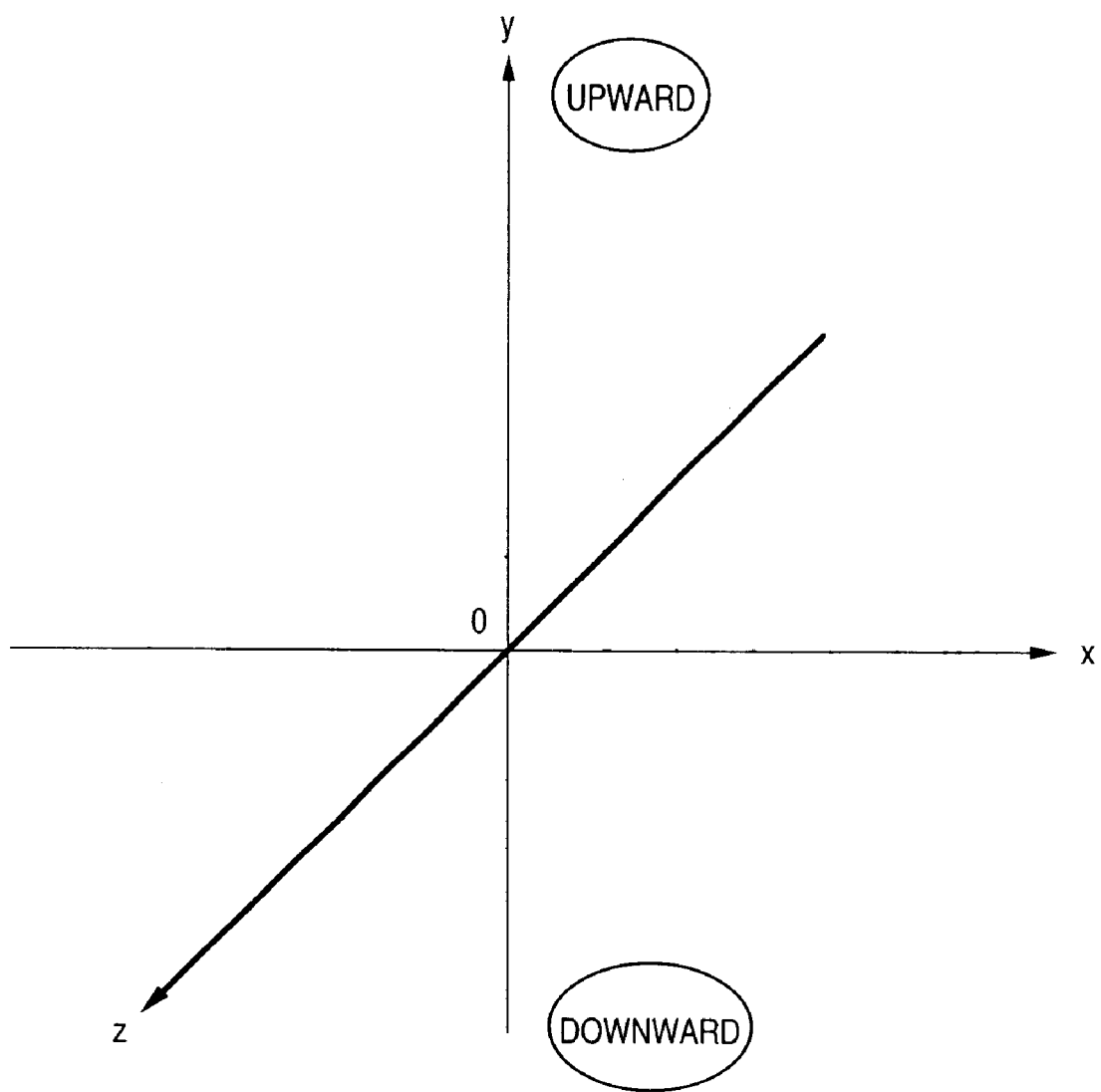
FIG. 2 shows a global coordinate system.

The global coordinate system has an origin at an appropriate position, the z-x plane as a horizontal plane, and the y direction as a gravity direction as shown in FIG. 2. In this example, the position of the position and posture measurement unit 103 described later is set as an origin, but the origin can be arbitrarily set.

Figure 3A:
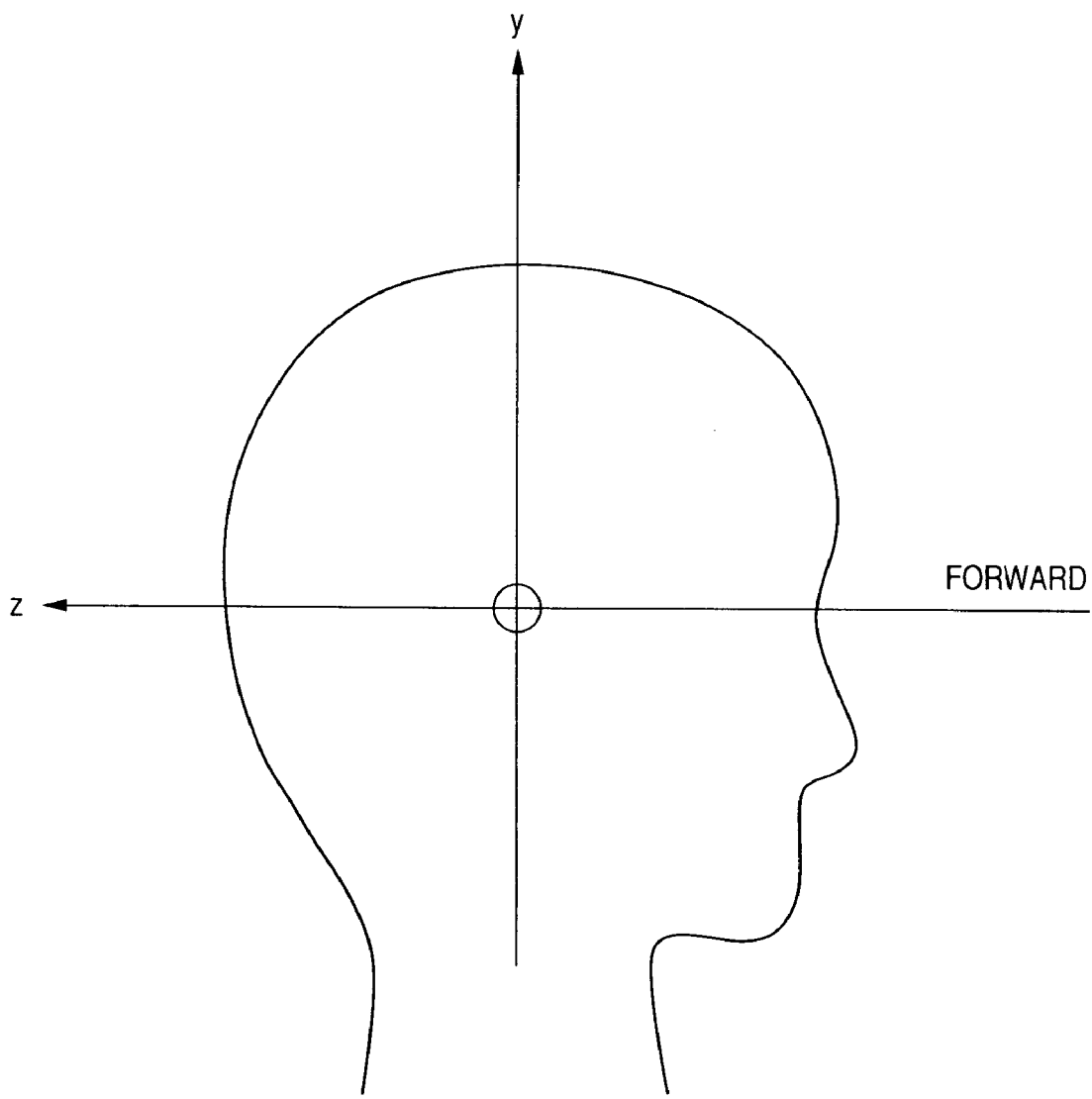
FIG. 3A shows the local coordinate system of the head of a user viewed from the right side of the user.
Figure 3B:
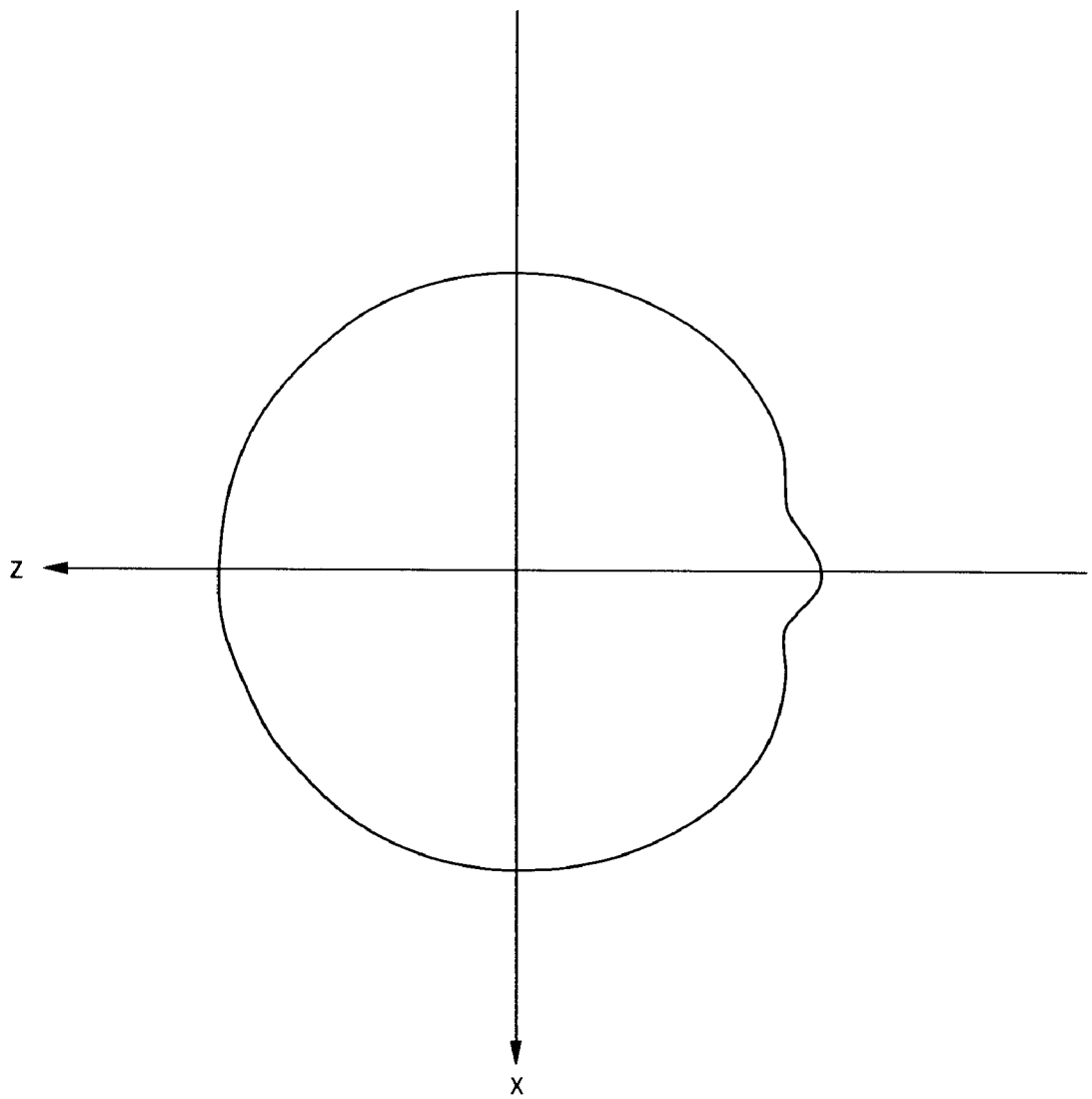
FIG. 3B shows the local coordinate system of the head of a user viewed from above the user.

The local coordinate system of the head of the user is shown in FIGS. 3A and 3B. FIG. 3A shows the view from the right side of the head of the user. FIG. 3B shows the view from above the head of the user.

Reference numeral 103 denotes a position and posture measurement unit. The position and posture measurement unit 103 specifies the position and posture of the head of the user according to the above mentioned signal input from the head position and posture sensor 102. On the other hand, the position and posture of the hand of the user in the global coordinate system is specified according to the signal input from a position and posture sensor 104 described later. The data of the above mentioned specified position and posture of the head of the user and the data of the position and posture of the hand of the user are output to the CPU 101.

The hand position and posture sensor 104 can be the same as the head position and posture sensor 102, and outputs a signal indicating the position and posture of the hand of a user in the global coordinate system to the position and posture measurement unit 103 by mounting the sensor on the hand (the portion of the body by which a dolphin appears, that is, the portion of the body for generating the picture of the dolphin) of the user.

Figure 4:
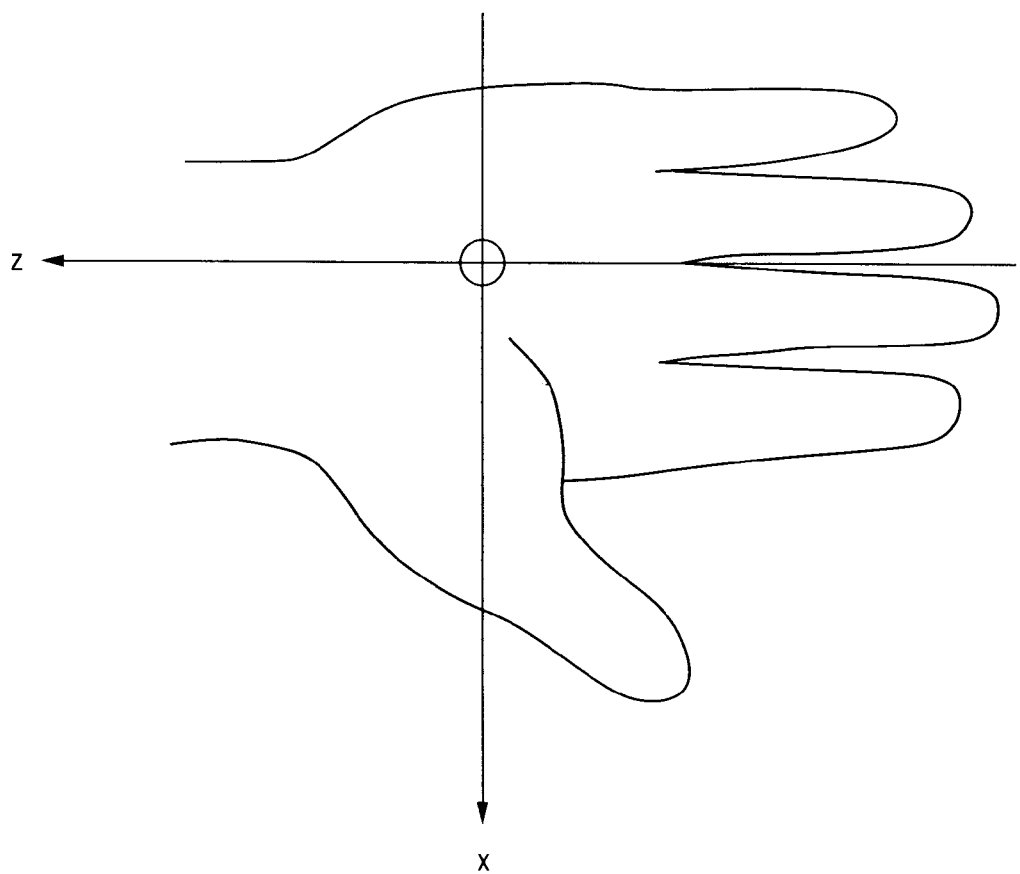
FIG. 4 shows the local coordinate system of the hand of a user.

FIG. 4 shows the local coordinate system of the hand when the hand position and posture sensor 104 measures the position and posture of the hand of the user, The position and posture of the head of the user, and the position and posture of the hand of the user measured as described above in the global coordinate system are represented as follows.

The position of the head of the user at time t: h! (t)

$$h!(t)=(hx, hy, hz) \qquad (1)$$

where h! is a vector notation of h
The posture of the head of the user at time t:
θr roll angle
θp pitch angle
θy yaw (direction angle)
The position of the hand of the user at time t: P! (t)

$$P!(t)=(Px, Py, Pz) \qquad (2)$$

where P! is a vector notation of P
The posture of the hand of the user at time t:
θr roll angle
θp pitch angle
θy yaw (direction angle)

The data of the above mentioned position and posture of the head of the user and the data of the above mentioned position and posture of the hand of the user are input to the CPU 101. Described below is the method of detecting the movement of the user by the CPU 101 based on the data.

The position P'! of the hand based on the position and the direction angle of the head of the user can be obtained by the following arithmetic operation (by the CPU 101).

$$P'!=P!\times T\_(h!)\times Ry\_(\theta y) \qquad (3)$$

where T__ indicates the inverse transform of a parallel movement transform T, Ry__ indicates the inverse transform of a rotation transform Ry on the y axis.

Based on the direction of the head of the user, the movement vector d! of the position P'! of the hand at time t+Δt can be obtained as follows.

$$d!=P'!(t+\Delta)-P'!(t) \qquad (4)$$

The speed vector v! indicating the moving speed of the hand can be obtained as follows.

$$v!=d!/\Delta t \qquad (5)$$

As a result, the movement of the hand based on the head of the user can be detected as follows by the elements vx, vy, and vz in the respective directions of x, y, and z of the speed vector v!.

vx>0: moved to right vx<0: moved to left
vy>0: moved up vy<0: moved down
vz>0: moved backward vz<0: moved forward However, since it is not necessary to detect a very small movement of the hand, the determination of each of the direction elements vx, vy, and vz can be made not by the positive or negative signs, but by whether or not a predetermined threshold is exceeded. That is, assuming that the predetermined threshold is E, the elements can be determined as follows.

vx>ϵ: moved to right vx<-ϵ: moved to left
vy>ϵ: moved up vy<-ϵ: moved down
vz>ϵ: moved backward vz<-ϵ: moved forward The value of ϵ can be varied for each direction element. As a result of the determination, if the direction of the movement of the hand is detected, it is determined that the hand of the user has been waved in the direction. When it is determined that the hand has been waved, the numbers of times the hand has been waved in the − and + directions in a predetermined time are counted. The predetermined time can be measured by a clock timer not shown in the attached drawings.

Back in FIG. 1, reference numeral 105 denotes a head mounted display (hereinafter referred to as an HMD). The HMD 105 comprises a CCD 105b and a display unit 105c. By displaying on the display unit 105c the picture (a compound picture of the picture actually captured by the CCD 105b and the picture of a dolphin existing in the virtual space) compounded by an image generation unit 106 described later, the user with the HMD 105 provided at the head can feel as if there were a dolphin just before the user. As a result, the reality of the dolphin in the real space can be recognized by the user. The HMD 105 has two types of see-through systems, that is, an optical see-through system and a video see-through system. The detailed explanation is omitted here about the see-through systems because the present invention does not directly relate to a see-through system. In this embodiment, the video see-through system, that is, the HMD, for displaying a picture actually captured by the CCD 105b on the display unit 105c, and compounding and displaying a picture of the dolphin generated by the image generation unit 106 is adopted. The HMD can be an optical see-through system. If the HMD 105 is an optical see-through system, The HMD 105 is not provided with the CCD 105b.

The image generation unit 106 may perform an optional image processing (gamma amendment, gray-scale transform, etc.) on the picture actually input from the CCD 105b if the HMD 105 is a video see-through system. Then, a compound picture obtained by compounding a picture of the dolphin generated based on the position and posture of the dolphin viewed from the position of the eyes of the user and a picture actually captured as described above, or a picture actually captured and treated in an optional image processing is output on the display unit 105c.

The position and posture of the dolphin viewed from the position of the eyes of the user is represented by a matrix (a position and posture matrix Md of a dolphin). The matrix is generated using a matrix Mh indicating the status (position and posture) of the head of the user, and a matrix Mt indicating the status (position and posture) of the hand of the user respectively generated from the data of the position and posture of the head of the user, and the data of the position and posture of the hand of the user. Since the method of generating the matrix is a well-known computing method, the detailed explanation is omitted here. The matrix is generated (computed) by the CPU 101.

On the other hand, if the HMD 105 is an optional see-through system, the HMD 105 is not provided with the display unit 105c as described above. Therefore, the image generation unit 106 outputs only the picture of the dolphin generated in the above mentioned method and viewed from the position of the user to the display unit 105*c*.

Reference numeral 107 denotes a speaker. The speaker 107 outputs voice synthesized by a voice synthesis unit 108 described later. The output from the speaker 107 is not limited to voice, but, for example, an effective sound can be output corresponding to a predetermined movement of the dolphin.

The voice synthesis unit 108 synthesizes a voice when the dolphin makes a voice. As described above, an effective sound can be generated. When the dolphin makes a voice, the voice data and the effective sound in each situation are associated with each situation and stored in the memory (not shown in the attached drawings) in the pet status management unit 110 as table data. The voice data and the effective sound are described later in detail.

Reference numeral 109 denotes a data communications unit. The data communications unit 109, comprises a network interface circuit, a communications terminal, etc., and can establish data communications with a compound reality presentation apparatus which allows another user to experience the above mentioned compound reality.

According to this embodiment, the pet status management unit 110 manages the status of the dolphin, for example, the communications level with the dolphin, a table describing the movements of the dolphin, etc.

The ROM 111 stores a program code and data used for control of the entire compound reality presentation apparatus as described above. It also stores the settings required to activate the apparatus, a character code used in displaying a character on the display unit, etc.

The RAM 112 has an area for temporarily storing a program code and data loaded from the external storage device 113, and also has a work area for use by the CPU 101 executing various program codes.

The external storage device 113 can be an HDD, etc., and stores various program codes and data installed from a storage medium such as CD-ROM, a floppy disk, etc. When the work area in the RAM 112 is not large enough, a temporary file as a virtual work area can be generated in the area of the external storage device 113.

The method for calling a dolphin to the hand of a user using the compound reality presentation apparatus with the above mentioned configuration is described below by referring to FIGS. 5A, 5B, 5C, and 5D. According to this embodiment, communications levels are set for a dolphin. That is, at a communications level 1, the dolphin is called and communications are established once or twice with the dolphin.

<Communications Level 1>

According to this embodiment, the method for calling a dolphin is defined as 'waving the hand of a user from side to side five times or more within five seconds'.

Figure 5A:
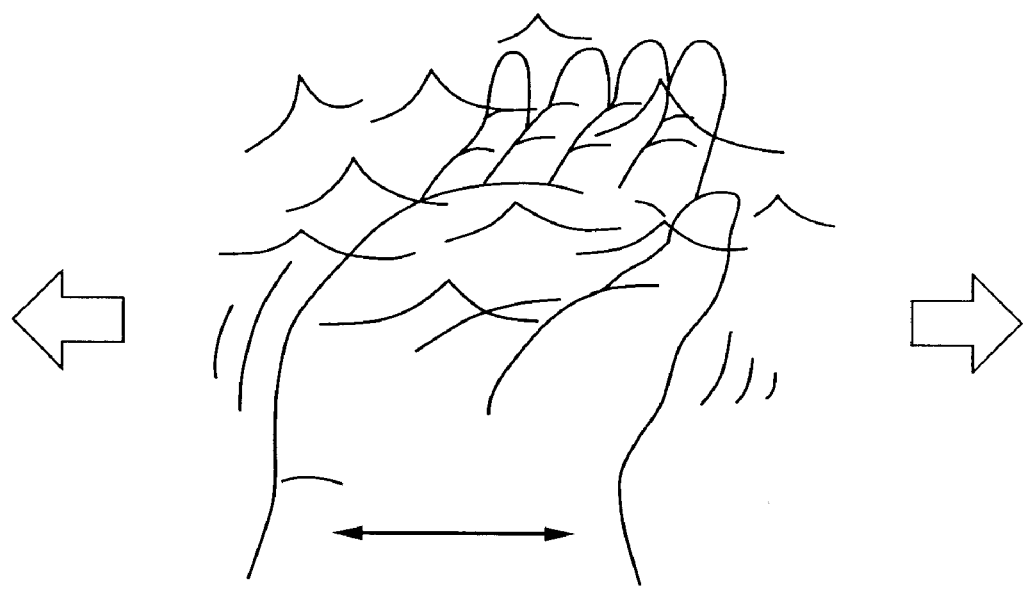
FIG. 5A shows the status of calling a dolphin at a communications level 1.

When the user waves his or her hand from side to side five times or more within five seconds, as described above, the speed vector of the hand of the user is computed by the CPU 101, and the number of times the value of vx changes is counted to determine whether or not it has exceeded a threshold ($\epsilon$) (determine whether or not the hand has been waved). At this time, as shown in FIG. 5A, a compound picture of waves is generated by the image generation unit 106 at the position of the hand of the user. This compound picture is displayed on the display unit 105*c* of the HMD 105.

When the count value reaches 5 or more, the CPU 101 reads the data (hereinafter referred to as motion data) of the movement when the dolphin appears which is stored in the memory (not shown in the attached drawings) in the pet status management unit 110, and regenerates the movement of the dolphin. The movement is made by the dolphin when the head of the dolphin appears above the wave as shown in FIG. 5A.

Described below is the method for specifying the motion data depending on the situation. The memory (not shown in the attached drawings) in the pet status management unit 110 stores the motion data of the dolphin depending on each situation, and the length of each motion depends on each situation.

That is, there can be a 60-frame motion, a 100-frame motion, etc. A frame refers to the smallest unit of the movement of a dolphin. For example, if a motion A is a 100-frame motion, 1 frame equals ¹⁄₁₀₀ of the movement.

The memory (not shown in the attached drawings) in the pet status management unit 110 stores the table shown in FIG. 6. Reference numeral 601 denotes a number MT (motion number) for specification of each motion. Reference numeral 602 denotes a leading address of a table storing each motion.

Figure 7:
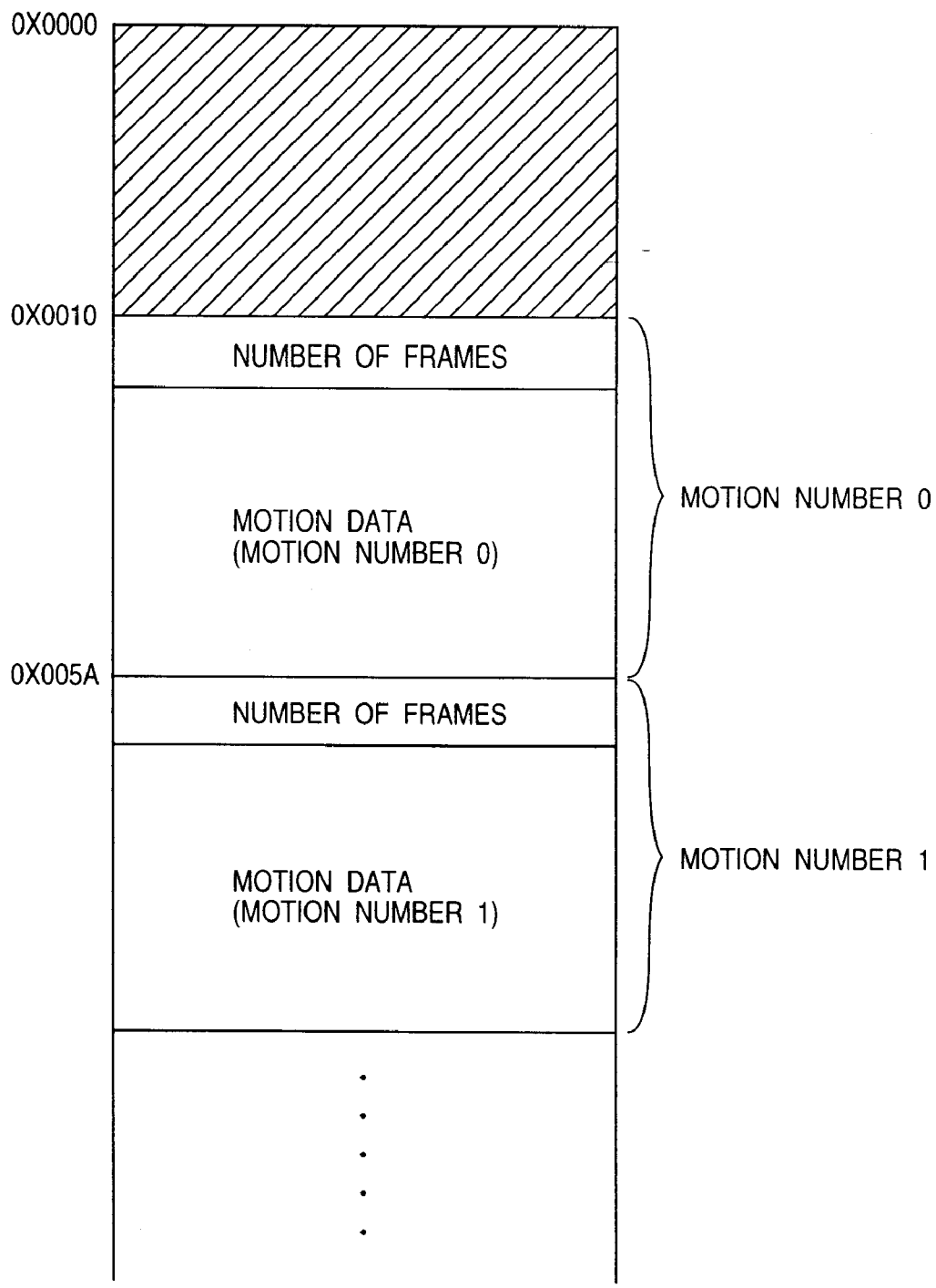
FIG. 7 shows a memory area in the memory (not shown in the attached drawings) in a pet status management unit 110 storing motion data.

FIG. 7 shows a memory area in the memory (not shown in the attached drawings) in the pet status management unit 110 storing the motion data. For example, since the motion data address specified by the motion number 0 is 0x005A as shown in FIG. 6, the CPU 101 may read the data starting with 0x005A in the memory area shown in FIG. 7. As shown in FIG. 7, at the head of the area starting with the motion data address 0x005A, the number of frames of the motion having the motion number 0 is stored. Therefore, the CPU 101 can assign the motion specified by the motion number 0 to the dolphin by reading the data (motion data) for the number of frames at the address after the address at which the number of frames is stored.

The contents of the motion data can be, for example, the position and posture of a dolphin, the position and posture of each part (fin, mouth, eyes, etc.) of a dolphin depending on each movement of the dolphin, etc. in the local coordinate system having a predetermined position as an origin.

According to the explanation above, various motions can be assigned to the dolphin by specifying each motion number for the dolphin.

The motion number can be specified by the number S (status number) indicating the status of the dolphin. For example, at the communications level 1, the status of the dolphin can be:

S=1: The head of a dolphin appears above the water.
S=2: The dolphin jumps above from the surface of the water (and enters the water).
S=3: The dolphin disappears into the water.

Assume that the status number S is 0 when the dolphin does not appear above the water. The status number is not limited to the above mentioned four numbers, but other status numbers can be assigned. To assign other numbers, a status number S can be prepared depending on the status.

For example, the motion depending on each motion number MT can be defined as follows.

MT=1: The head of a dolphin appears above the water.
MT=2: The dolphin jumps above from the surface of the water (and enters the water).
MT=3: The dolphin disappears into the water.

Figure 8:
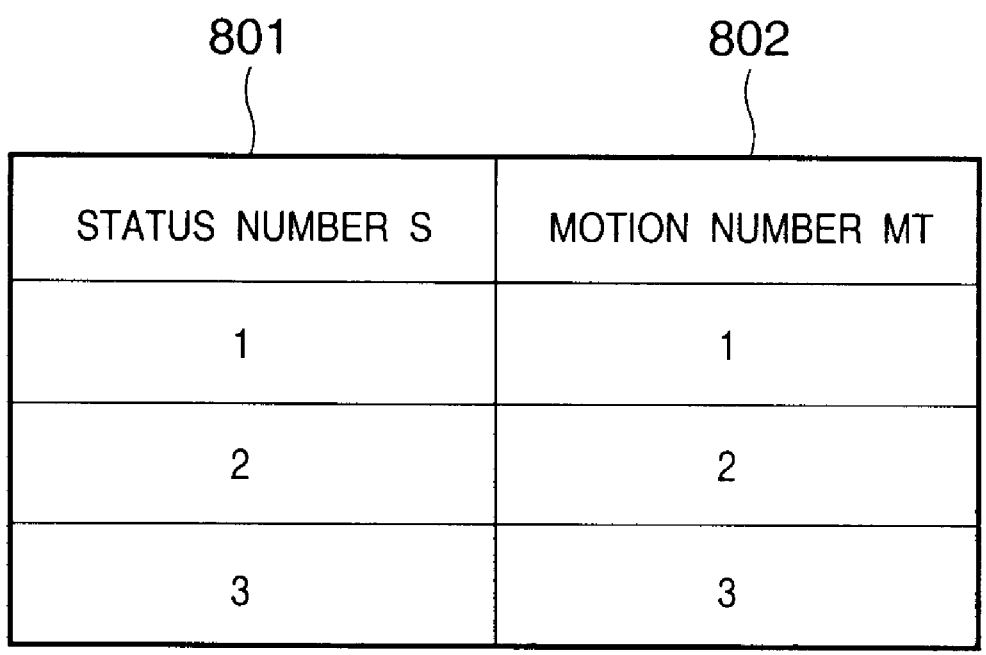
FIG. 8 shows a table storing a status number and a motion number corresponding to the status number.
Figure 9:
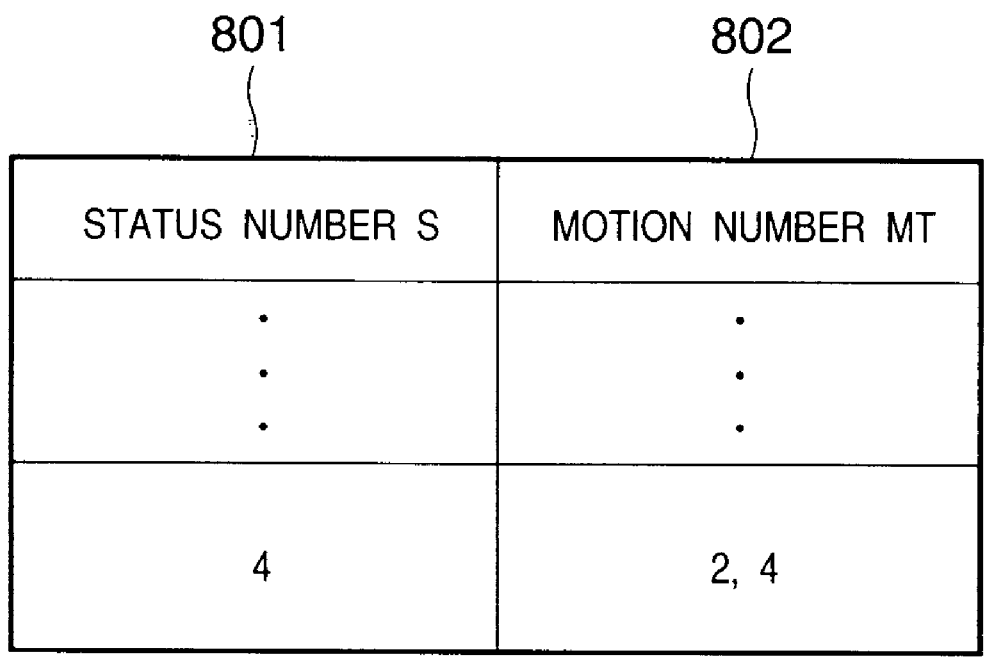
FIG. 9 shows the case in which plural types of motion correspond to one status.

Assume that the motion number MT is 0 when the dolphin does not appear above the water. The table shown in FIG. 8 is used to specify the motion number depending on each status number S. In FIG. 8, one status of the dolphin corresponds to one motion. If a plurality of motions of the dolphin correspond to one status of the dolphin, for example, S=4 indicates the status of 'a dolphin is pleased', the motion 'the head of the dolphin appearing above the water and the dolphin smiling' is added, and the motion number MT of the motion is set to MT=4. In this case, as shown in FIG. 9, the S=4 can be corresponded to MT=2, 4. In this case, if the status of the dolphin is 'being pleased' (S=4), the motion 'jumping above the water (and entering the water)' indicated by MT=2 is first performed, and then the motion 'the head of the dolphin appearing above the water, and the dolphin smiling' indicated by MT=4 is executed. In this case, the motion connecting the two motions (MT=2, MT=4) is interpolated in a well-known method, thereby generating totally smooth motions.

As shown in FIG. 8, when one motion is assigned to one status of a dolphin, then the status number S of the dolphin can be used as the motion number MT.

The tables shown in FIGS. 8 and 9 are stored in the memory (not shown in the attached drawings) in the pet status management unit 110.

Figure 5B:
FIG. 5B shows the status of a dolphin showing its face above the water at a communications level 1.

Back in FIG. 5B, when the status of the dolphin changes from that shown in FIG. 5A to that shown in FIG. 5B, the status number S of the dolphin is S: 0→1. As a result, the motion number MT of the dolphin is MT: 0→1. The change of the motion corresponding to the change of the motion number MT can be smoothly made by the above mentioned interpolation of motions.

For example, in the status shown in FIG. 5B, it is assumed that 'the dolphin disappears if the user waves his or her hand from side to side three times or more within three seconds'. When the user waves his or her hand three times within three seconds, it is determined as when the dolphin is called that the user 'has waved' his or her hand from side to side three times, and the dolphin disappears. At this time, the status number S of the dolphin is changed from S: 1→3, and the motion number MT is changed from MT: 1→3.

Figure 5C:
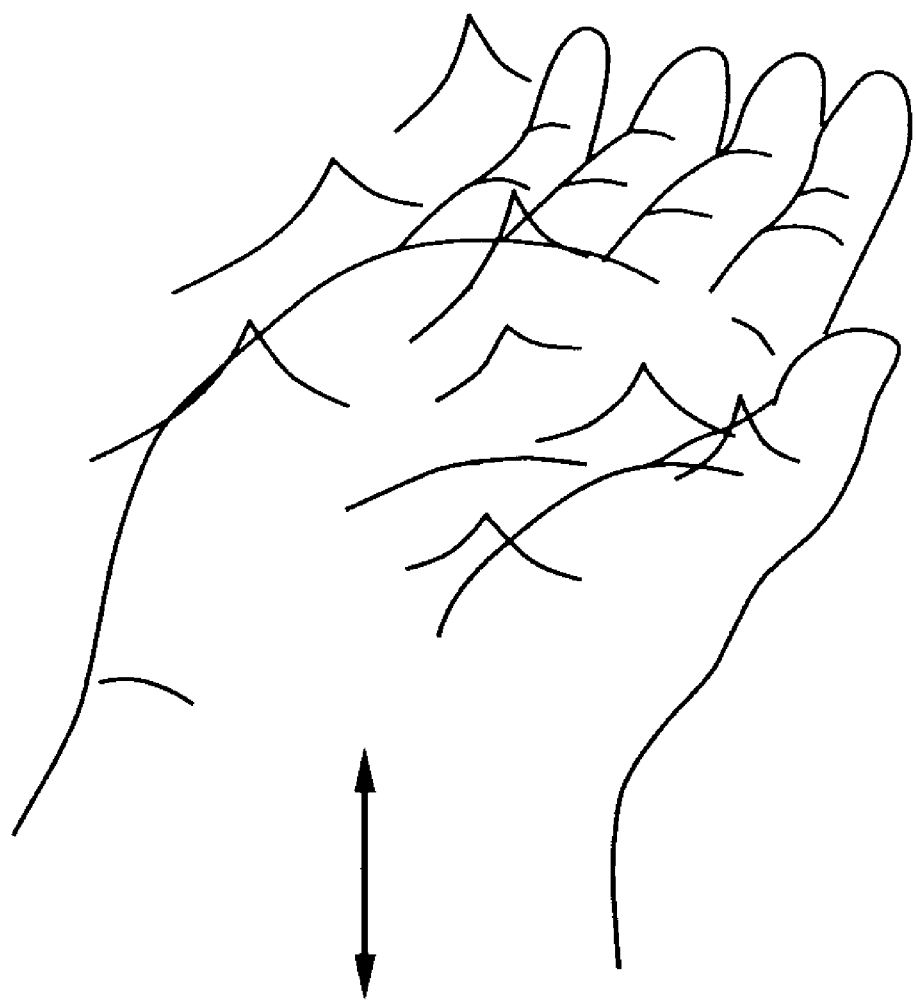
FIG. 5C shows the movement of a user waving his or her hands up and down.
Figure 5D:
FIG. 5D shows the movement of a dolphin jumping as a result of the movement of the user shown in FIG. 5C.

If it is assumed that 'the dolphin jumps' as shown in FIG. 5D when 'the user waves his or her hand up and down twice' as shown in FIG. 5C in the status shown in FIG. 5A, then status number S is S: 0→2, and the motion number MT is MT: 0→2 if the user waves his or her hand up and down twice. Also a change can be made from the status shown in FIG. 5B to the status shown in FIG. 5D. In this case, the status number S is S: 1→2, and the motion number MT is MT: 1→2.

Figure 10:
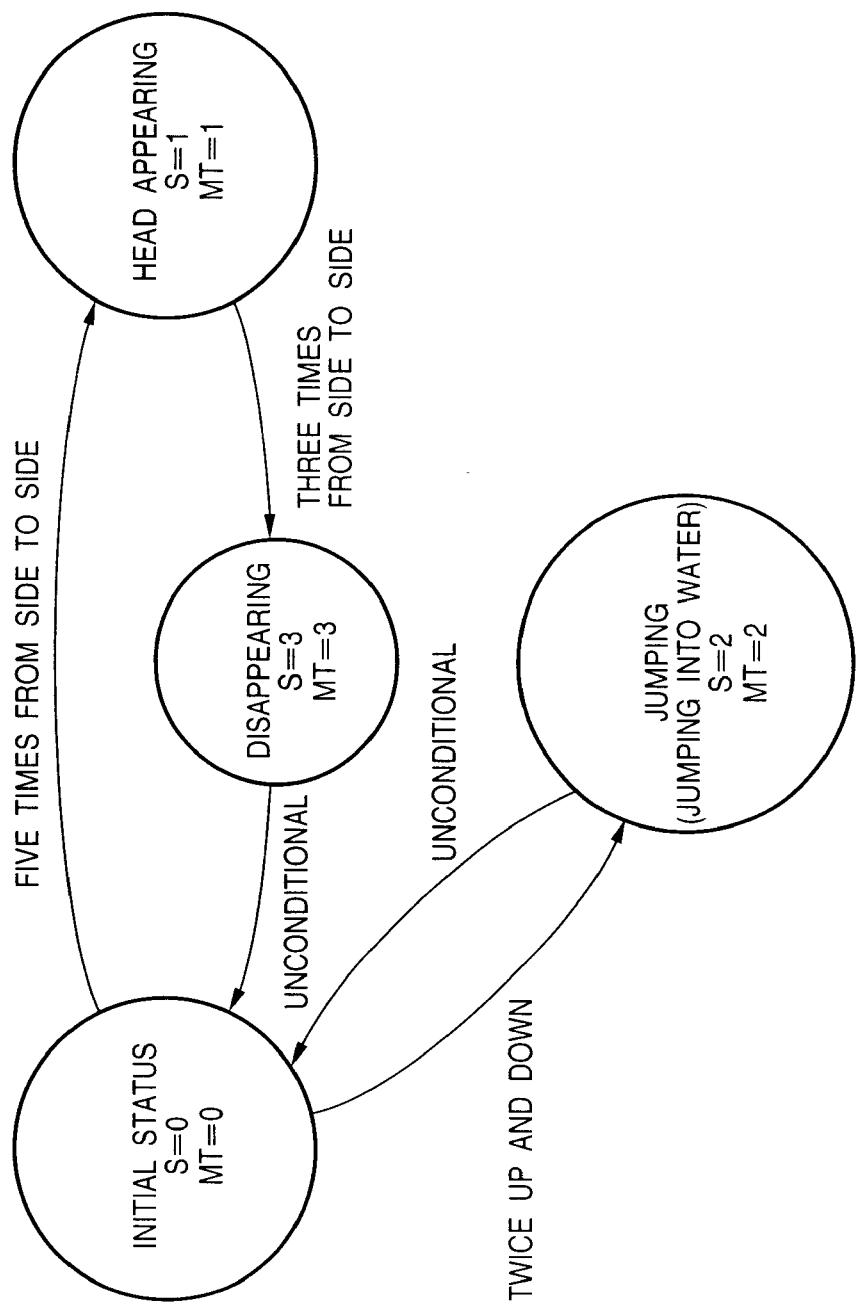
FIG. 10 shows the status change rule of a dolphin at communications level 1.

FIG. 10 shows the status change rule of a dolphin depending on the movement of a user as described above. In FIG. 10, it is assumed that the change from the status 'jumping above the water (and entering the water)' (S=2, MT=2) to the initial status (S=0, MT=0), or from the status 'disappearing' (S=3, MT=3) to the initial status (S=0, MT=0) can be unconditionally made.

Therefore, the status of a dolphin changes depending on the movement of the hand of a user, and the operability (communications) of the dolphin can be directly recognized by regenerating the motion data specified by the motion number MT depending on the change of the status.

The above mentioned communications between a user and a dolphin is referred to as the communications level 1 which is a level before starting the actual communications between the user and the dolphin.

<Communications Level 2>

At the communications level 1, if the number of times of status changes excluding the unconditional status changes is, for example, three times or more, then the process passes to the communications level 2. When the communications level 2 is entered, the initial status of the dolphin at this level is defined as 'the head appearing above the water' (status number S=1). That is, the initial status at the communications level 2 is the status shown in FIG. 5B.

As the status of the dolphin at the communications level 2, the following two types of status are added to the three types at the communications level 1.

S=4: The dolphin looks at the user.
S=5: The dolphin becomes upset.

Two numbers of motions (motion numbers) MT corresponding to respective types status of a dolphin are defined below in addition to the three numbers at the communications level 1.

MT=4: The dolphin looks at the user.
MT=5: The dolphin becomes upset.

In the status (S=1, MT=1) shown in FIG. 5B, for example, if it is assumed that 'when the user waves his or her hand forward and backward or from side to side twice or more within two seconds, the dolphin looks at the user', the status number S: 1→4 and the motion number MT: 1→4 if the user waves his or her hand forward and backward or from side to side twice within two seconds. If it is determined that, as described above, the speed vector vx or vz of the hand has changed over E(threshold) twice or more within two seconds, it is determined that the user has waved his or her hand forward and backward or from side to side twice within two seconds.

When the dolphin looks at the user, the motion specified by MT=4 is regenerated, and the dolphin has to be directed toward the user. Therefore, the direction of the user from the viewpoint of the dolphin is required. In this case, the direction from the position of the dolphin to the position of the head of the user is computed using the data of the position (the position of the hand of the user) of the dolphin, and the data of the position of the head of the user at the time point of the status number S=4.

In the status S=1, for example, if it is assumed that 'the dolphin becomes upset when the user tilts his or her hand by 30 degrees or more (on the z axis in the local coordinate system of the hand)', then the position and posture measurement unit 103 measures the position and posture according to the signal of the position and posture of the hand of the user output from the position and posture sensor 104 to the position and posture measurement unit 103. If the result indicates the tilt of 30 degrees or more, the status number S of the dolphin is S: 1→5, and the motion number MT is MT: 1→5 correspondingly.

Afterwards, as the communications level 1, the status of the dolphin changes depending on the movement of the hand of the user, and the motion of the dolphin changes correspondingly. Therefore, as the communications level 1, the user can directly recognize the operability (communications) with the dolphin.

Figure 11:
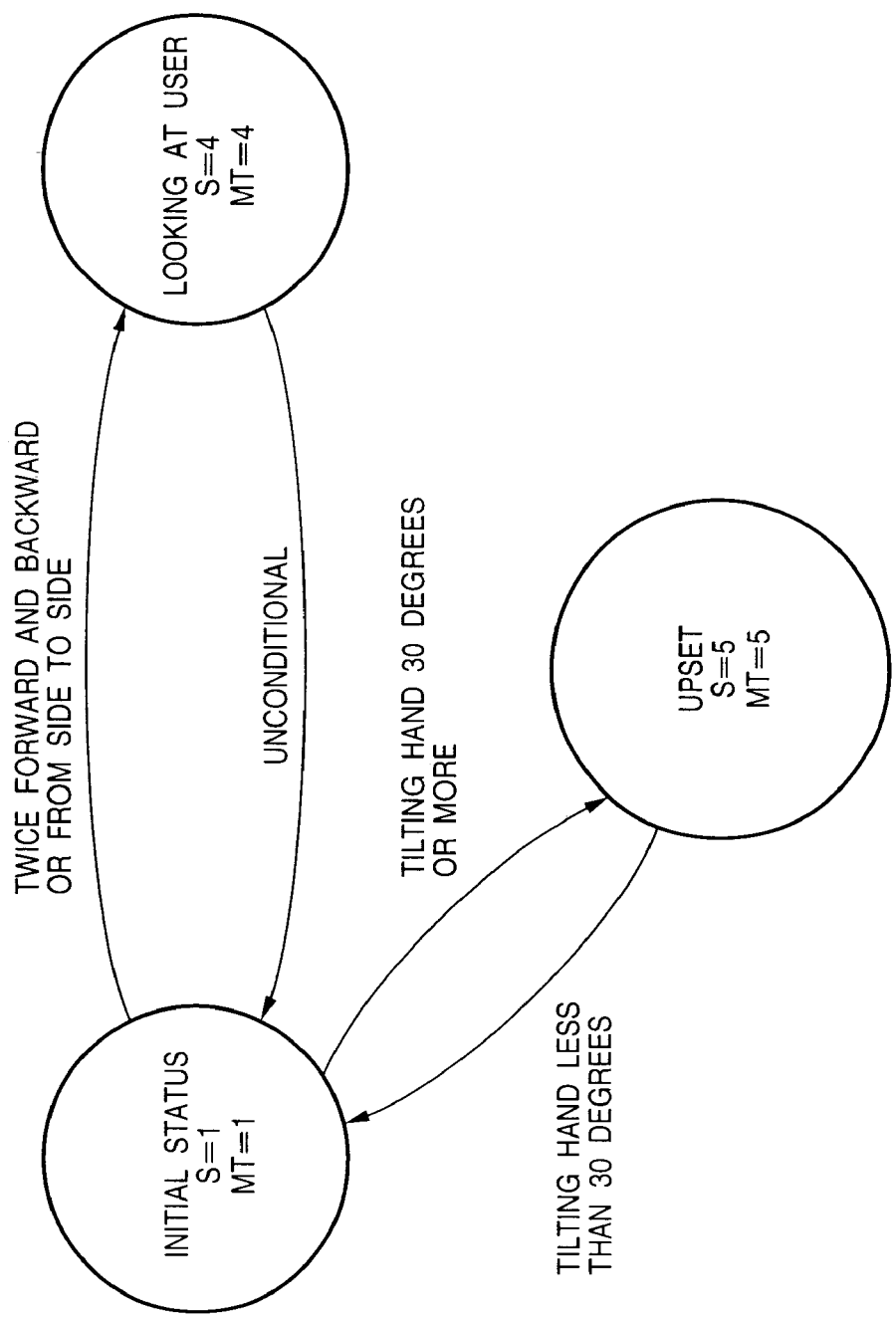
FIG. 11 shows the status change rule of a dolphin at communications level 2.

FIG. 11 shows the status change rule of a dolphin depending on the movement of a user at the above mentioned communications level 2. In FIG. 11, in the state 'the dolphin looks at the user' (S=4), when the motion 'the dolphin looks at the user' specified by MT=4 terminates, the process unconditionally returns to the initial status. Furthermore, the status 'the dolphin becomes upset' (S=5) continues while the tilt of the hand of the user is 30 degrees or more, the motion 'the dolphin becomes upset' continues for the period. If the tilt of the hand of the user becomes lower than 30 degrees, and the motion 'the dolphin becomes upset' terminates, then the process returns to the initial status.

At the communications level 2, even if the status indicated by the same number (for example, S=2) as the communications level 1 is entered, the motion (MT=2) does not have to be the same as that at the communications level 1, but can be any of other motions.

The communications, above description, between the user and the dolphin is referred to as the communications level 2, that is, the primary communications between the user and the dolphin, at which the communications are started from the user, and the dolphin answers by action.

<Communications Level 3>

At the communications level 2, when the number of times of the status changes excluding the unconditional status changes is, for example, five or more, the process enters the communications level 3. Then, it is assumed that the initial status at the communications level 3 is, as the communications level 2, 'the head of the dolphin appears above the water' (status number S=1). That is, at the communications level 3, the initial status is the status as shown in FIG. 5B.

At the communications level 3, the dolphin autonomously speaks to the user, and the contents of the speech of the dolphin are stored as a plurality of tables (speech contents tables). For example, if the user does nothing for a predetermined time, the contents of the speech of the dolphin are selected from among the tables, and voice data is generate by the voice synthesis unit 108 based on the selected contents, and the voice data is output as voice from the speaker 107. Furthermore, the dolphin casts a glance at the user from time to time. The speech contents table is stored in the memory (not shown in the attached drawings) in the pet status management unit 110, and is referred to by the CPU 101.

Two more types of status of the dolphin at the communications level 3 are added as the status of the dolphin to the types of the status at the communications levels 1 and 2.

S=6: The dolphin laughs pleasantly.
S=7: The dolphin complains.

Two numbers of motions (motion numbers) MT corresponding to each status of the dolphin are added to the communications levels 1 and 2.

MT=6: The dolphin laughs pleasantly.
MT=7: The dolphin complains.

In the initial status (S=1, MT=1) shown in FIG. SB, for example, if it is assumed that 'the dolphin laughs pleasantly when the user waves his or her hand forward and backward or from side to side three times within three seconds', the status number S: 1→6 and the motion number MT: 1→6 when the user waves his or her hand forward and backward or from side to side three times within three seconds. It can be determined that the user has waved his or her hand forward and backward or from side to side three times within three seconds using the speed vector vx or vz of the hand as described above when the status number S=4.

The laughter (contents of speech) of the dolphin is selected at random from among plural types of laughter by referring to the above mentioned speech contents table, and is output to the speaker 107 as voice as described above. When the type of laughter is selected, for example, as shown in FIG. 13, a speech contents table having the configuration in which the status number S is used as voice type group number 1301 is generated. When S=6, the group number is 6. Therefore, in the speech contents data, the data in the range indicated by 1304 is selected as probable data, and the data of laughter can be specified by selecting at random a sub-number 1302 (1 to 3 when S=6). Similarly, in the case of S=7, the data in the range indicated by 1305 is selected as probable data, and the speech contents of complaint can be selected by selecting at random a sub-number 1302. In this table, an effective sound in addition to the voice contents data can be stored. It is obvious that the method for specifying the contents of the speech according to the above mentioned explanation can also be applied. The table shown in FIG. 13 is stored in the memory (not shown in the attached drawings) in the pet status management unit 110.

Then, in the status S=1, if it is assumed that, for example, 'the dolphin complains if the user tilts his or her hand by 30 degrees or more (on the z axis in the local coordinate system of the hand), then the tilt of the hand is measured by the hand position and posture sensor 104 and the position and posture measurement unit 103 as described above for the status number S=5. If the measured tilt of the hand is 30 degrees or more, the status number S of the dolphin is S: 1→7, and the motion number MT is MT: 1→7 correspondingly. Since the contents of the complaint corresponding to the status number S=7 are stored in the above mentioned speech contents table, the contents from the table are selected at random, the voice data is generated by the voice synthesis unit 108 based on the contents, and the voice data is output as voice from the speaker 107.

Afterwards, as the communications levels 1 and 2, the status of the dolphin changes depending on the movement of the hand of the user, and the motion of the dolphin changes correspondingly. Therefore, as the communications levels 1 and 2, the user can directly recognize the operability (communications) with the dolphin.

Figure 12:
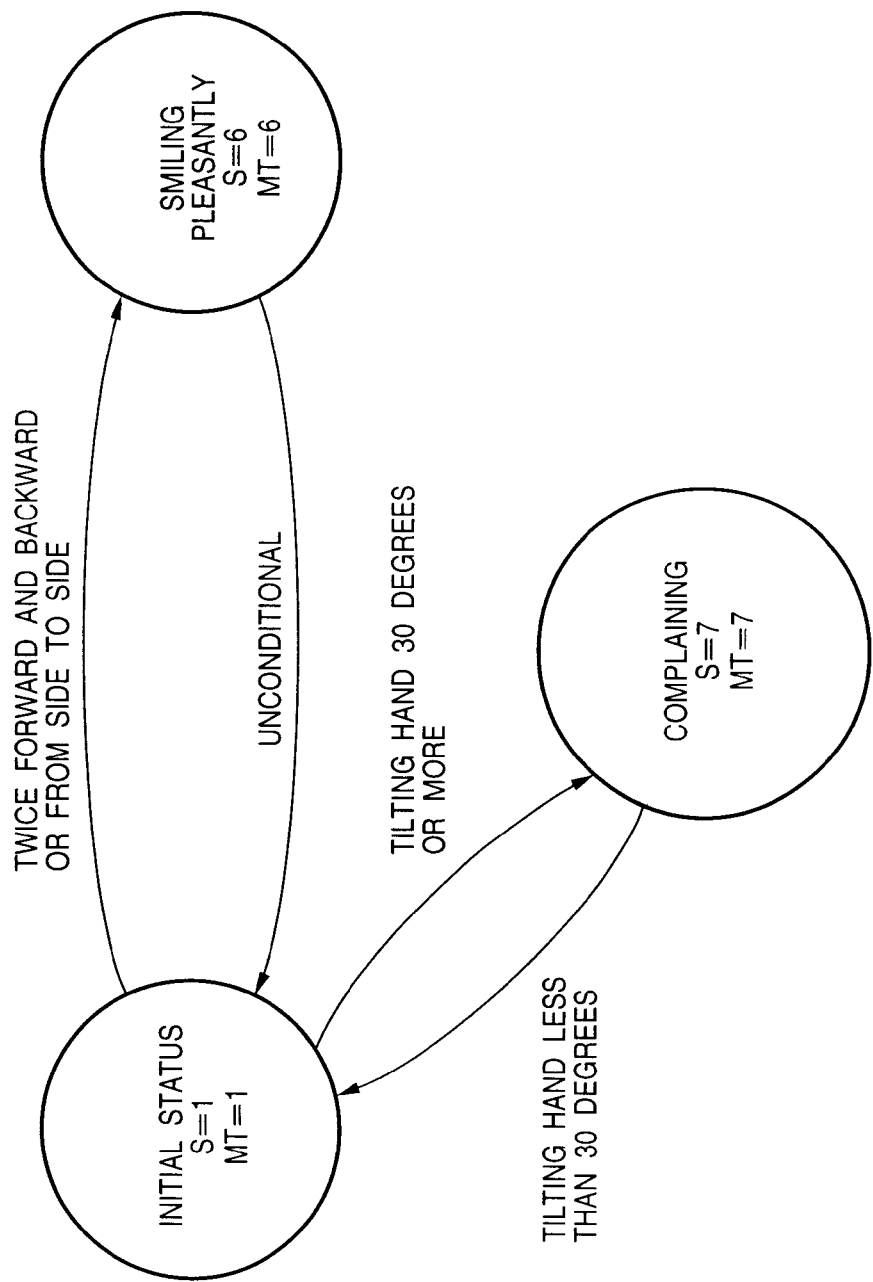
FIG. 12 shows the status change rule of a dolphin at communications level 3.

FIG. 12 shows the status change rule of the dolphin depending on the movement of the user at the above mentioned communications level 3. In FIG. 12, at the state 'the dolphin laughs pleasantly (S=6), when the motion 'the dolphin laughs pleasantly' (MT=6) of the dolphin terminates, the process unconditionally changes into the initial status (S=1, MT=1). With the change of the status, the voice of 'laughing pleasantly' stops.

The above mentioned communications between the user and the dolphin is referred to as the communications level 3 at which the communications between the user and the dolphin can be interactively performed more than the communications level 2, and the dolphin makes a sound with its voice.

At the communications level 3, the contents of the sound made by the dolphin are output as voice through the speaker 107. However, the speech contents data shown in FIG. 13 can be described on the table shown in FIG. 13 not as voice data but as characters, and the table can be referred to, thereby outputting the contents of the speech of the dolphin as the superimposition to the HMD 105 in the image format, and displaying it on the display unit 105c.

<Completing Communications>

Regardless of the communications level, the user can terminate the communications with the dolphin. The method can be, for example, 'the dolphin jumps into the water and terminates the communications with the user if the hand of the user is lifted at or higher than a predetermined level and waved from side to side (the act of waving good-bye)'.

At this time, the status number S of the dolphin is set to 3 (jumping into the water), (and the motion number MT=3) and then, as described above for the communications level 1, S is unconditionally set to 0 (motion number MT=0).

The termination of the communications is not limited to this method. That is, if it is assumed that, for example, 'the dolphin waves good-bye and jumps into the water' when the user performs the act of terminating the above mentioned communications, the status number of the dolphin can be S=99, and the corresponding motion number MT of the dolphin can be 99. The motion specified by the motion number MT (=99) is 'the dolphin waves good-bye and jumps into the water'. When the motion specified by the motion number MT=99 terminates, the status number S and the motion number MT are unconditionally set to 0.

<Process Performed by the Compound Reality Presentation Apparatus According to This Embodiment>

FIGS. 14 to 17 are flowcharts of the processes performed by the compound reality presentation apparatus according to this embodiment. The program codes according to the flowcharts shown in FIGS. 14 to 17 are stored in the RAM 112 (or in the ROM 111), and are read out and executed by the CPU 101.

Figure 14:
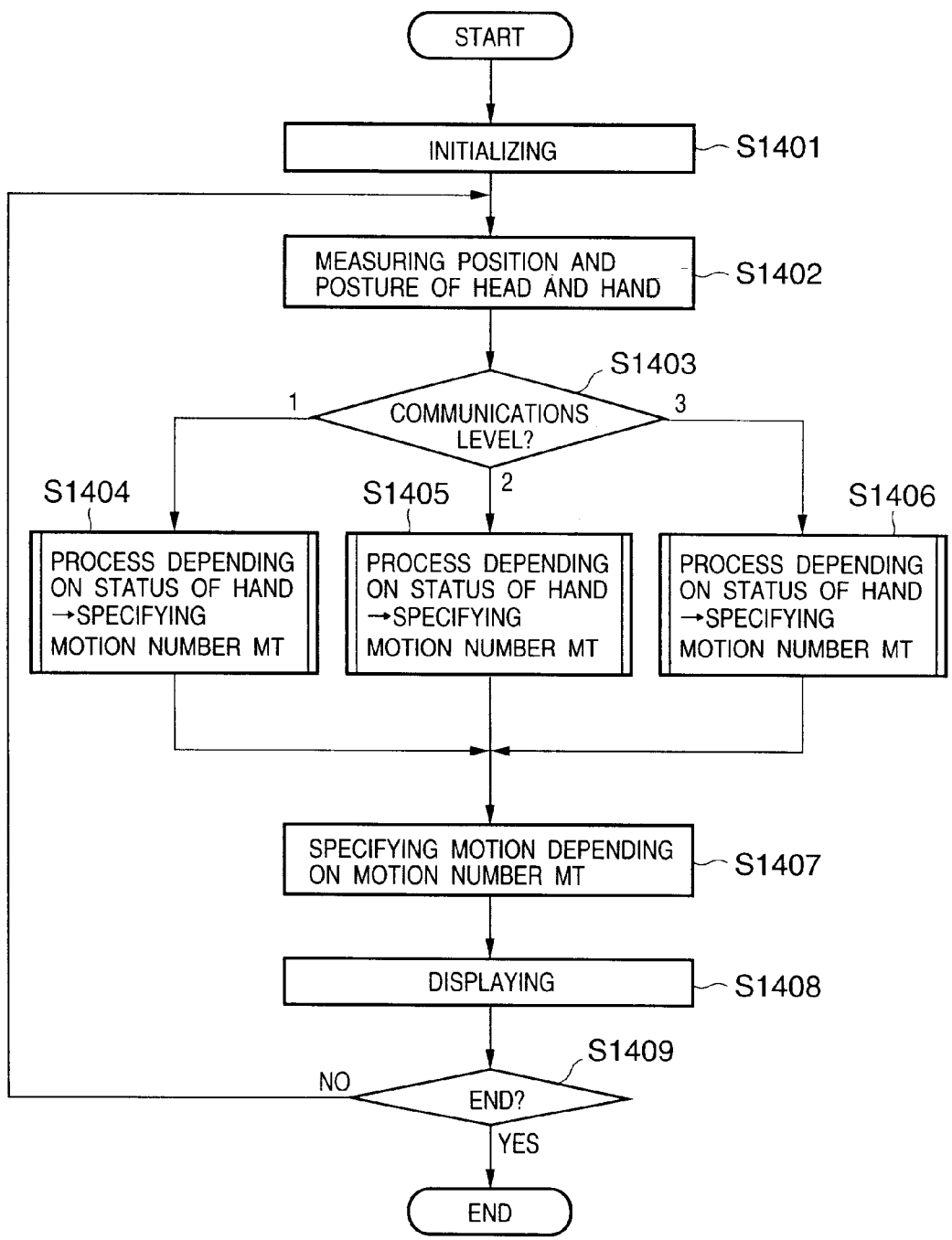
FIG. 14 is a flowchart of the process mainly performed by the compound reality presentation apparatus according to the first embodiment of the present invention.

FIG. 14 is a flowchart of the process mainly performed by the compound reality presentation apparatus according to this embodiment.

First, the process is initialized. In this embodiment, for example, the communications level is set to 1, the model data of a dolphin is read out, the status number S and the motion number MT of the dolphin are set to 0, and the number of times of the status changes is set to 0 at each communications level (step S1401).

Then, the status of the head and the hand of the user is measured (step S1402). The measuring method is described above, and the above mentioned matrices Mh and Mt are generated from the measured results. The number of times the user has waved his or her hand from side to side or up and down is also counted. If it is determined that the user stopped 'waving' his or her hand for a predetermined time, then the count value is reset.

Then, the process branches to each of the subroutines (steps S1404, S1405, and S1406) depending on the communications levels (step S1403).

As a result of the process at each communications level, a motion corresponding to the determined motion number MT is specified to generate the position and posture matrix Md of the dolphin (step S1407), and the model of the dolphin is displayed (step S1408).

Then, it is determined whether or not the communications are to be terminated. If it is not terminated (if the user does not make the above mentioned terminating movement), then the process is transferred to step S1402.

Figure 15:
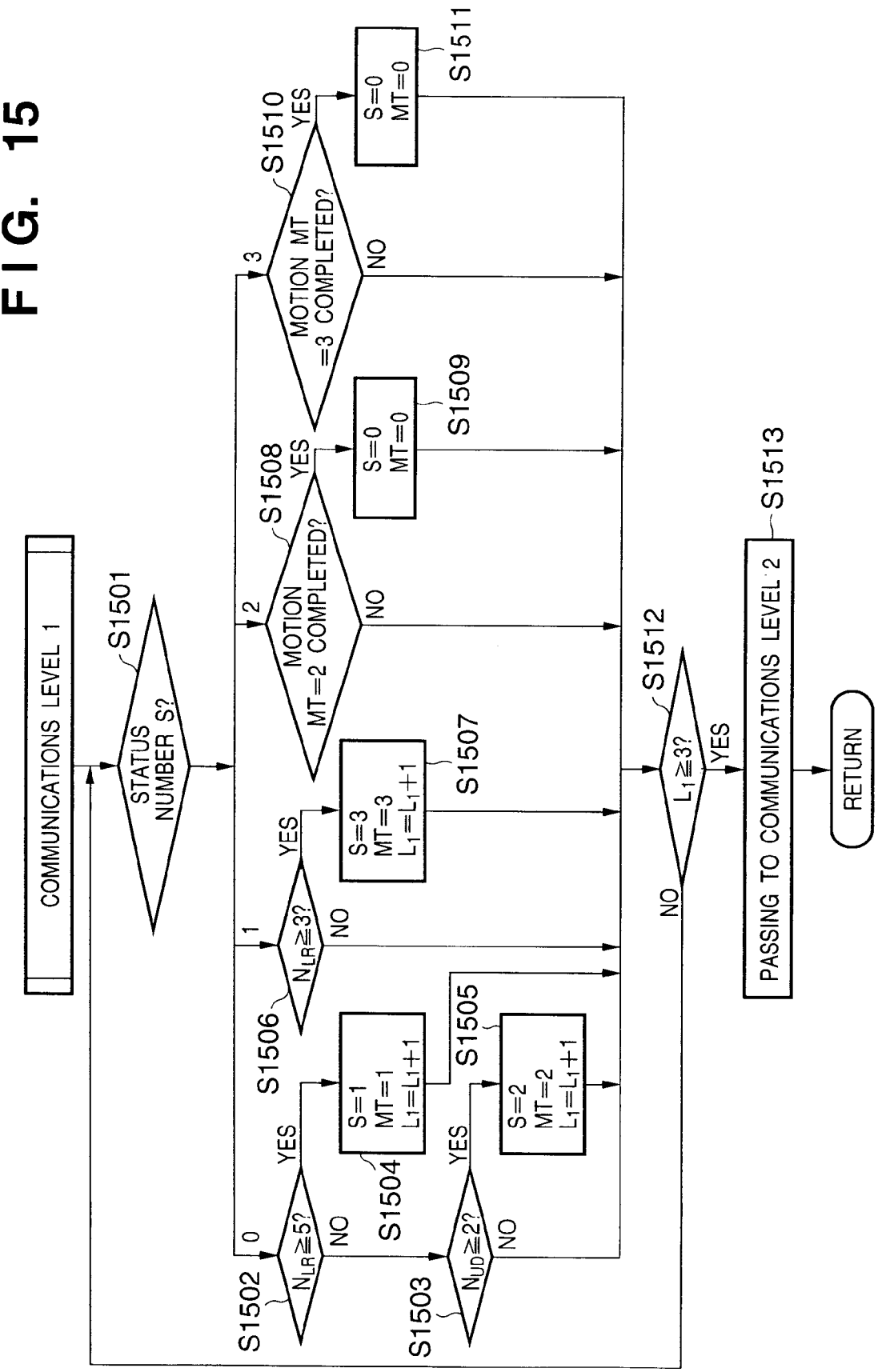
FIG. 15 is a flowchart of the process performed mainly by the compound reality presentation apparatus according to the first embodiment of the present invention at a communications level 1.

FIG. 15 is a flowchart of the process performed by the compound reality presentation apparatus according to this embodiment at the communications level 1. The process according to the flowchart is the process of changing a status as shown in FIG. 10. In the descriptions below, the variable indicating the number of times the user waves his or her hand from side to side is NLR, the variable indicating the number of times the user waves his or her hand up and down is NUP, and the number of times of the state changes at the communications level 1 is L1.

First, using the status number S, control is branched to the process corresponding to each status of the dolphin (step S1501).

First described below is the case of S=0 (the dolphin has not appeared yet). As described above, if NLR≧5 (the user waves his or her hand from side to side five times or more) (step S1502), then S=1, MT=1 (the head of the dolphin appears above the water), and the number of times of the status changes is increased by 1 (L1=L1+1) (step S1504). On the other hand, if NLR<5 and NUP≧2 (the user waves his or her hand up and down twice or more) (step S1503), then S=2, MT=2 (the dolphin jumps from the water (and jumps into the water)), and the number of times of the status changes is increased by 1 (step S1505).

If S=1, and NLR≧3, then S=3, MT=3, L1=L1+1 (step S1507).

If S=2, the dolphin is jumping from the water. Therefore, it is determined whether or not the jumping motion (motion number MT=2) has terminated (whether or not the dolphin has jumped into the water) (step S1508). If it has terminated, then S=0 and MT=0 (step S1509). The status change S: 2→0 is unconditionally performed. Therefore, the number L1 of times of status changes is not counted.

When S=3 (the dolphin disappears into the water), as in the case of S=2, it is determined whether or not the motion (motion number MT=3) of disappearing into the water has terminated (step S1510). If it has terminated, then S=0 and MT=0 (step S1511).

Then, it is determined whether or not the number of times of the status changes L1≧3 (step S1512). If L1<3, then the process is passed to step S1501. If L1≧3, then the communications level is raised by 1 and the process enters the communications level 2 (step S1513).

Figure 16:
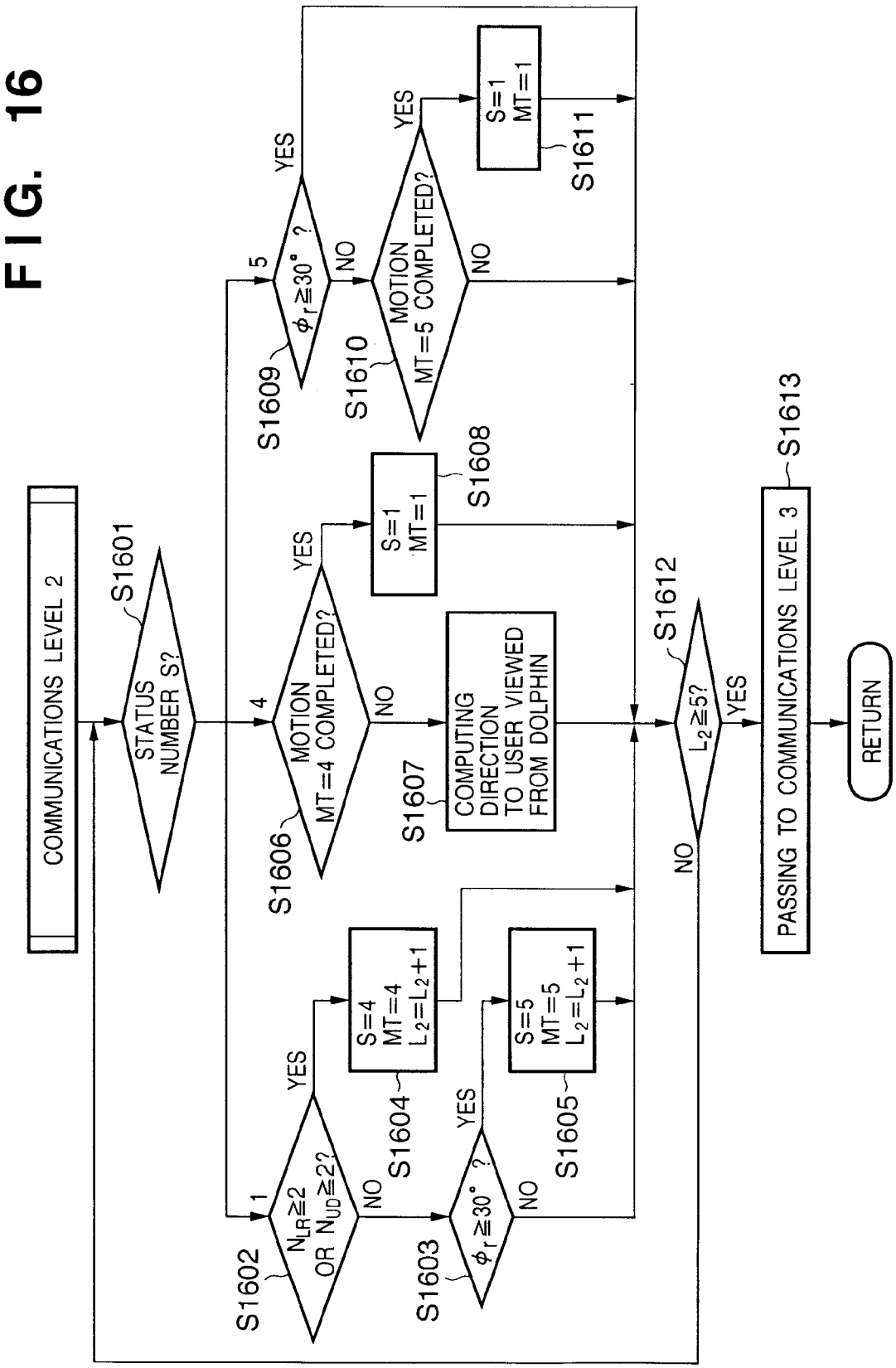
FIG. 16 is a flowchart of the process performed mainly by the compound reality presentation apparatus according to the first embodiment of the present invention at a communications level 2.

FIG. 16 is a flowchart of the process performed by the compound reality presentation apparatus according to this embodiment at the communications level 2. The process according to the flowchart is the process of the status change shown in FIG. 11. The variable indicating the number of times of the status changes at the communications level 2 is L2.

The process according to the flowchart is branched to the process depending on each status of the dolphin by the status number S as in the process at the communications level 1 shown in FIG. 15 (step S1601), the status number S and the motion number MT are changed depending on the movement of the hand of the user as described above, and the number of times of the status changes L2 excluding the unconditional status change is counted. If the number of times of the status changes L2 is L2≧5 (step S1612), then communications level is raised by 1, and the process is passed to the communications level 3 (step S1613).

Figure 17:
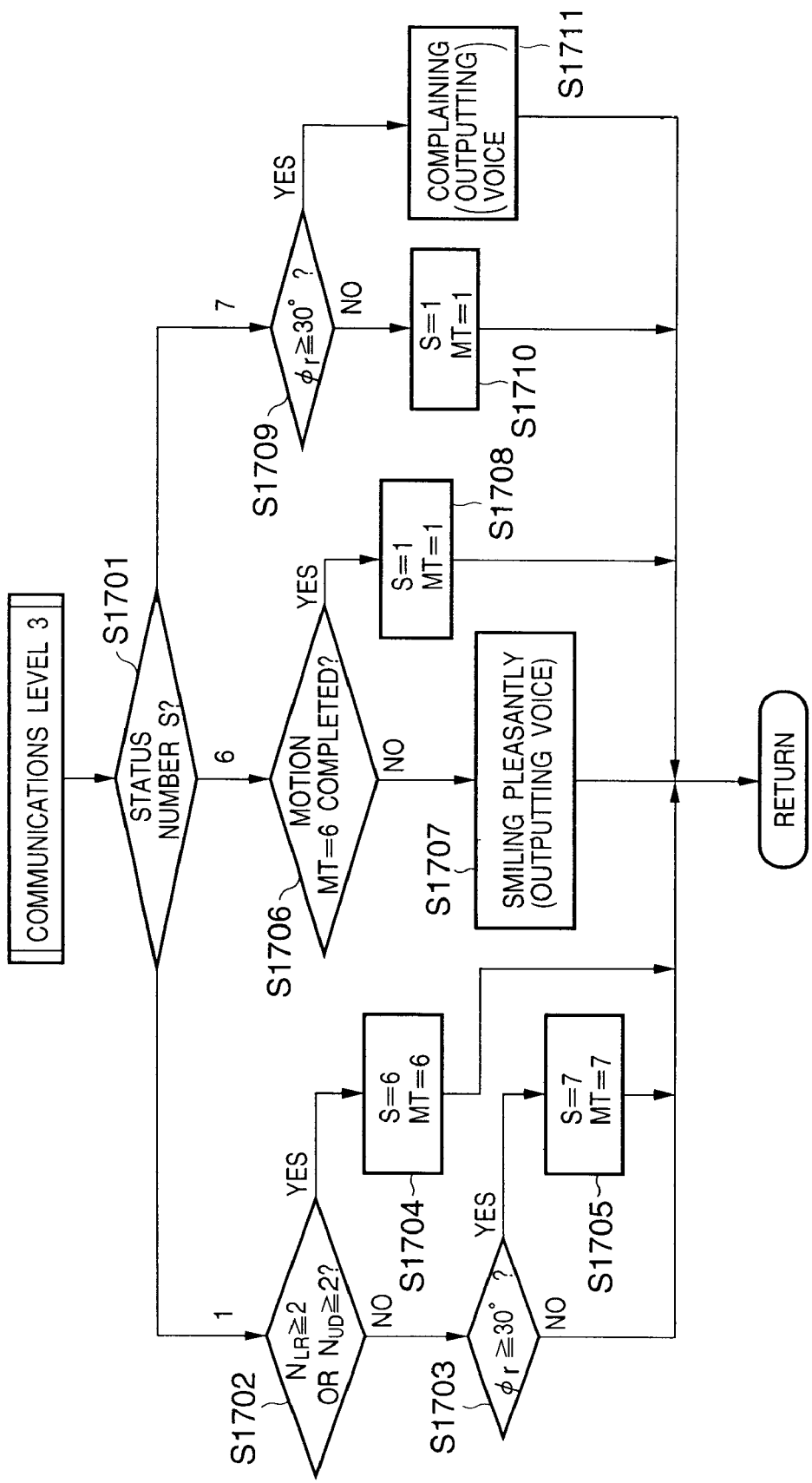
FIG. 17 is a flowchart of the process performed mainly by the compound reality presentation apparatus according to the first embodiment of the present invention at a communications level 3.

FIG. 17 is a flowchart of the process performed by the compound reality presentation apparatus according to this embodiment at the communications level 3. The process according to the flowchart is the process of the status change shown in FIG. 12.

The process according to the flowchart is branched to the process depending on each status of the dolphin according to the status number S as in the processes at the respective communications level 1 and 2 shown in FIGS. 15 and 16 (step S1701), and the status number S and the motion number MT are changed depending on the movement of the hand of the user as described above. At the communications level 3, the voice (or an effective sound) is output. In steps S1707 and S1711, the voice to be output is specified using the table shown in FIG. 13 in which the status number S is used as a group number as described above, and is output to the speaker 107.

As described above, using the compound reality presentation apparatus and method according to this embodiment, the user can transmit a message to the dolphin as a virtual object by the movement of his or her hand. The dolphin which has received the message from the user moves in response to the message, outputs voice, etc., thereby allowing the user to feel the compound reality in which the user can directly communicate with the dolphin.

[Second Embodiment]

According to the first embodiment, only the position and posture are used as sensors for measuring the status of the hand of the user. If an optical switch, a data glove (they are collectively referred to as a hand open/close sensor), etc. are attached to the user, the status (position and posture) of the finger of the user can be measured. For example, 'making a fist', 'opening the hand', etc. can be measured. The hand open/close sensor can be connected to the position and posture measurement unit 103 to analyze the signal indicating the opening/closing of the hand of the user input from the open/close sensor, and represent the status of the opening/closing of the hand of the user as the matrix.

Using the matrix, making a fist specifies the position of each finger (or each joint of each finger) of the user in the virtual space. According to the position and the position information about the dolphin, the contact between the hand of the user and the dolphin can be computed. As a result, for example, when the user gradually makes a fist, a new communication 'the dolphin is painful' between the user and the dolphin can be provided for the user.

The status number S specifying the status 'the dolphin is painful', the motion indicating the movement of the status, and the motion number MT specifying the motion are newly prepared, and added and stored in the memory (not shown in the attached drawings) in the pet status management unit 110 shown in FIG. 7, and the stored address and the motion number MT specifying the motion are added to the table shown in FIG. 6. Then, the status number S and the motion number MT are added to and stored in the table shown in FIG. 8. Thus, with the condition set to enter this status, the dolphin becomes painful when the user makes a movement satisfying the condition.

It is obvious that an example of using the open/close sensor of the hand is not limited to the example described above. For example, it is also possible to generate the status 'the dolphin is pleased' when the user opens his or her hand.

[Third Embodiment]

The first embodiment relates to the compound reality presentation apparatus and method for communications between a user and his or her pet (dolphin). According to this embodiment, there are a plurality of users in the same space, and a compound reality presentation system capable of providing the plurality of users with the compound reality obtained according to the first embodiment is explained.

Figure 18:
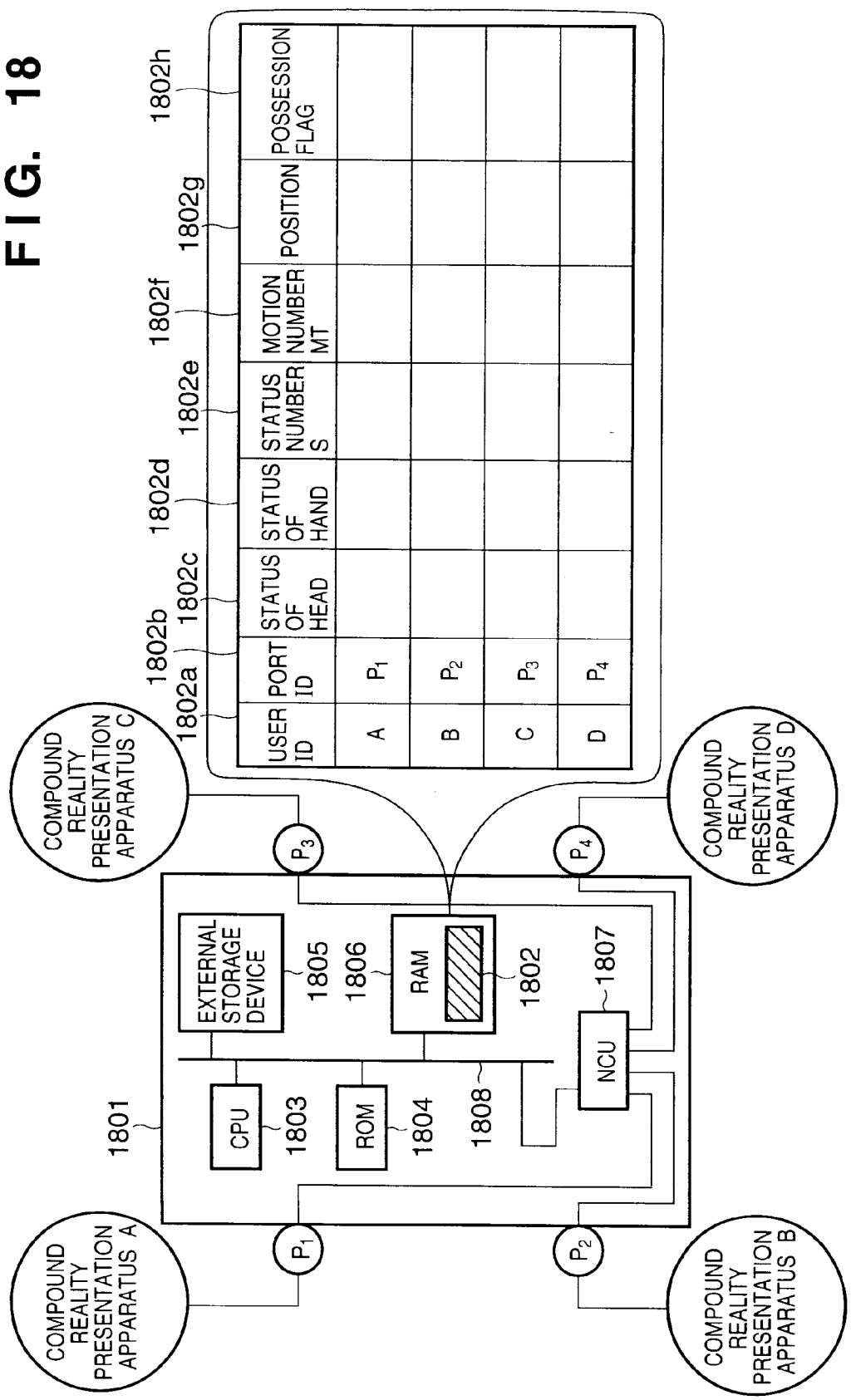
FIG. 18 shows the rough configuration of the compound reality presentation apparatus according to the third embodiment of the present invention.

FIG. 18 shows a rough configuration of the compound reality presentation system according to this embodiment. As shown in FIG. 18, the compound reality presentation system according to this embodiment comprises a server (1801) and four compound reality presentation apparatuses (A, B, C, and D). The server and the compound reality presentation apparatuses are connected through a network such as Ethernet, etc.

The server 1801 has four ports. The compound reality presentation apparatuses A, B, C, and D are connected to these four ports P1, P2, P3, and P4 through respective data communications units 109. Although not shown in the attached drawings, the users using respective compound reality presentation apparatuses A, B, C, and D are referred to as users A, B, C, and D.

The server 1801 has the following configuration.

Reference numeral 1803 denotes a CPU. The CPU 1803 control the entire server 1801 using the program code and data stored in RAM 1806 and ROM 1804, and controls the communications with the four connected compound reality presentation apparatuses A, B, C, and D.

Reference numeral 1804 denotes ROM. The ROM 1804 stores a program code and data for control of the server 1801. It also stores a character code, etc.

Reference numeral 1805 denotes an external storage device. The external storage device 1805 stores various driver, program code, data, etc. installed from a storage medium such as CD-ROM, a floppy disk, etc.

Reference numeral 1806 denotes RAM. The RAM 1806 stores a table 1802 described later, and can also be used as a work area for use by the CPU 1803 in performing each process described later.

Reference numeral 1807 denotes an NCU which is an interface for establishing communications with the above mentioned four compound reality presentation apparatuses A, B, C, and D.

Reference numeral 1808 denotes a BUS connecting the above mentioned units.

Described below is about the table 1802. The table 1802 contains information (1802a to 1802d) about the users using respective compound reality presentation apparatuses, and information (1802e to 1802g) about the dolphin of each user. A possession flag 1802h is set to 1 for a user who possesses a dolphin, and to 0 for a user who does not possess a dolphin.

As the information about the user who uses each apparatus, the positions of the head and the hand of the user is represented by absolute coordinates in the common space in which all users exist. The origin for measurement of the positions is the position of the position and posture measurement unit 103 according to the first embodiment. However, the origin according to this embodiment has to be common among all users. Therefore, a predetermined point is set as the position of the origin.

In addition to the table 1802, the server 1801 also stores the motion data and the speech contents table described in the first embodiment in the RAM 1806.

That is, the compound reality presentation apparatuses (compound reality presentation apparatuses A, B, C, and D) according to this embodiment are the compound reality presentation apparatuses obtained by removing the pet status management unit 110 from the compound reality presentation apparatus described by referring to the first embodiment. The table 1802 is obtained as a table of a part of the information contained in the pet status management unit 110 removed from each compound reality presentation apparatus. The compound reality presentation apparatuses A, B, C, and D according to this embodiment can grasp the status of the user using each apparatus and the status of the dolphin by referring to the table 1802, and allow the user of each apparatus to feel the compound reality explained by referring to the first embodiment.

Since the table 1802 can be referred to from every apparatus, for example, the user B using the apparatus B can view the dolphin operated by another user because the apparatus B can grasp the information about the dolphin of another user by referring to the table 1802.

<Variation 1>

Using the system according to this embodiment, the users can exchange their pets. For example, the user B transfers his or her pet to the user C. In this case, the act of a user who is exchanging a pet is defined as follows according to this embodiment.

Transfer Operation

'Users who exchange pets extend their hands toward each other's at a distance of about 20 cm from each other's, and the hand of the user who transfers the pet (user 1) is moved upward so as to be about 5 cm higher than the hand of the user who receives the pet (user 2).'

The operation of exchanging pets as described below is performed only from the user having the possession flag of 1 to the user having the possession flag of 0. However, in the method of configuring the table 1802, a user can possesses a plurality of dolphins (since this application is not within the scope of the present invention, the description of the method is omitted here). Therefore, in this case, pets are exchanged between arbitrary users.

By performing the transfer operation by the users who exchange pets, a pet jumps from the hand of the user 1 to the hand of the user 2, and thus the pet possessed by the user 1 is transferred to the user 2.

To practically explain the process below, the user 1 is referred to as the user B, the user 2 is referred to as the user C. However, it is obvious that the user 1 and 2 can be any other users.

The process performed by the compound reality presentation system according to this embodiment when pets are exchanged is described below by referring to FIGS. 19A to 19D.

Figure 19A:
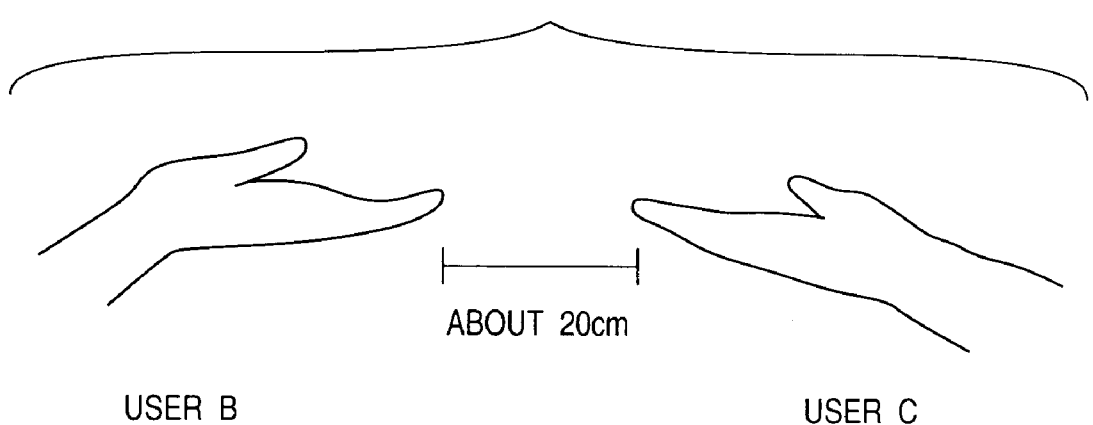
FIG. 19A shows the status of users B and C reaching each hand to each other's.

As a preparation stage for exchanging pets, as shown in FIG. 19A, the users B and C extend their own hands toward each other's at a distance of about 20 cm from each other's. The method of measuring the distance between the two users is performed as follows. The table 1802 contains the coordinates of the users B and C, and is constantly updated (the coordinates of the hands measured by the apparatuses B and C are read by the server 1801, and the table 1802 is updated). The CPU 1803 of the server 1801 computes the distance between the two users based on the coordinates of the users B and C. As shown in FIG. 19A, when the distance between the two users is about 20 cm, the server 1801 outputs a mode change signal to the apparatuses B and C of the users B and C. Upon receipt of the signals, the apparatuses B and C are changed into the pet exchange mode. The detailed explanation is given later.

Figure 19B:
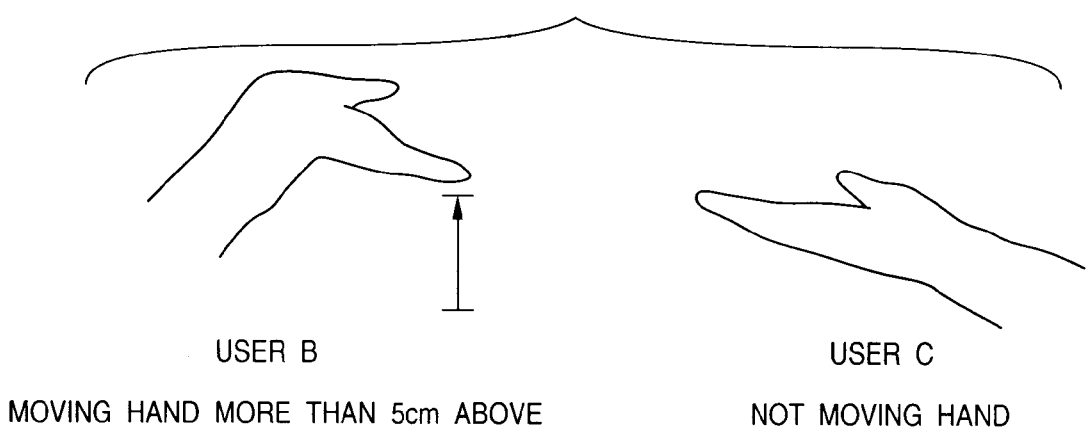
FIG. 19B shows the movement of the users B and C when dolphins are exchanged.
Figure 19C:
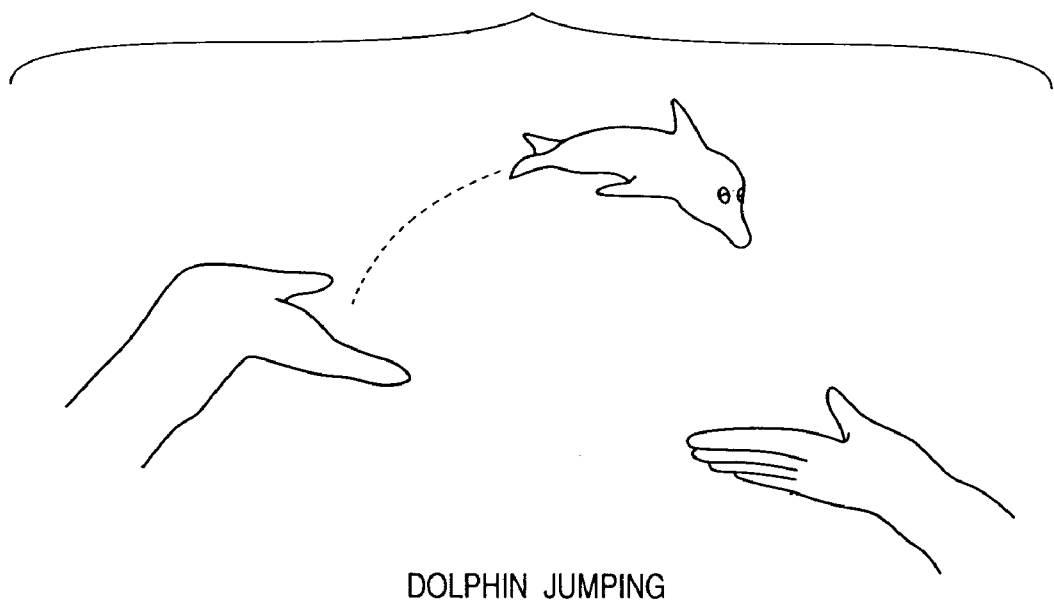
FIG. 19C shows the status of exchanging dolphins.
Figure 19D:
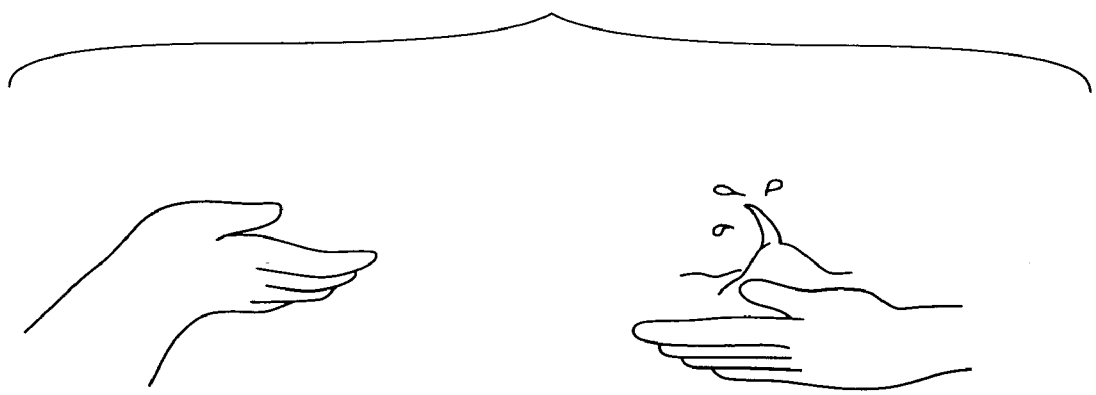
FIG. 19D shows the status after dolphins are exchanged.

If in the status shown in FIG. 19A the hand of the user B is moved about 5 cm up without moving the hand of the user C as shown in FIG. 19B, as shown in FIG. 19C, the dolphin of the user B jumps to the position of the hand of the user C from the position of the hand of the user B.

At this time, the status number S (50 in this case) of the dolphin of the user B, the motion 'the dolphin jumps 20 cm forward' as the motion of the dolphin corresponding to the status number S, and the number MT specifying the motion are registered in each table as described in the second embodiment. The above mentioned transfer operation is reffered condition of S=50, the above mentioned transfer shown in FIG. 19C can be performed when the users B and C perform the above mentioned transfer operations.

After the transfer operations (FIG. 19D), the possession flag of the user B is set to 0, and the possession flag of the user C is set to 1 in the table 1802. The information about the dolphin of the user B is copied as the information about the dolphin of the user C to the row of the user C as shown in FIG. 18.

Figure 21:
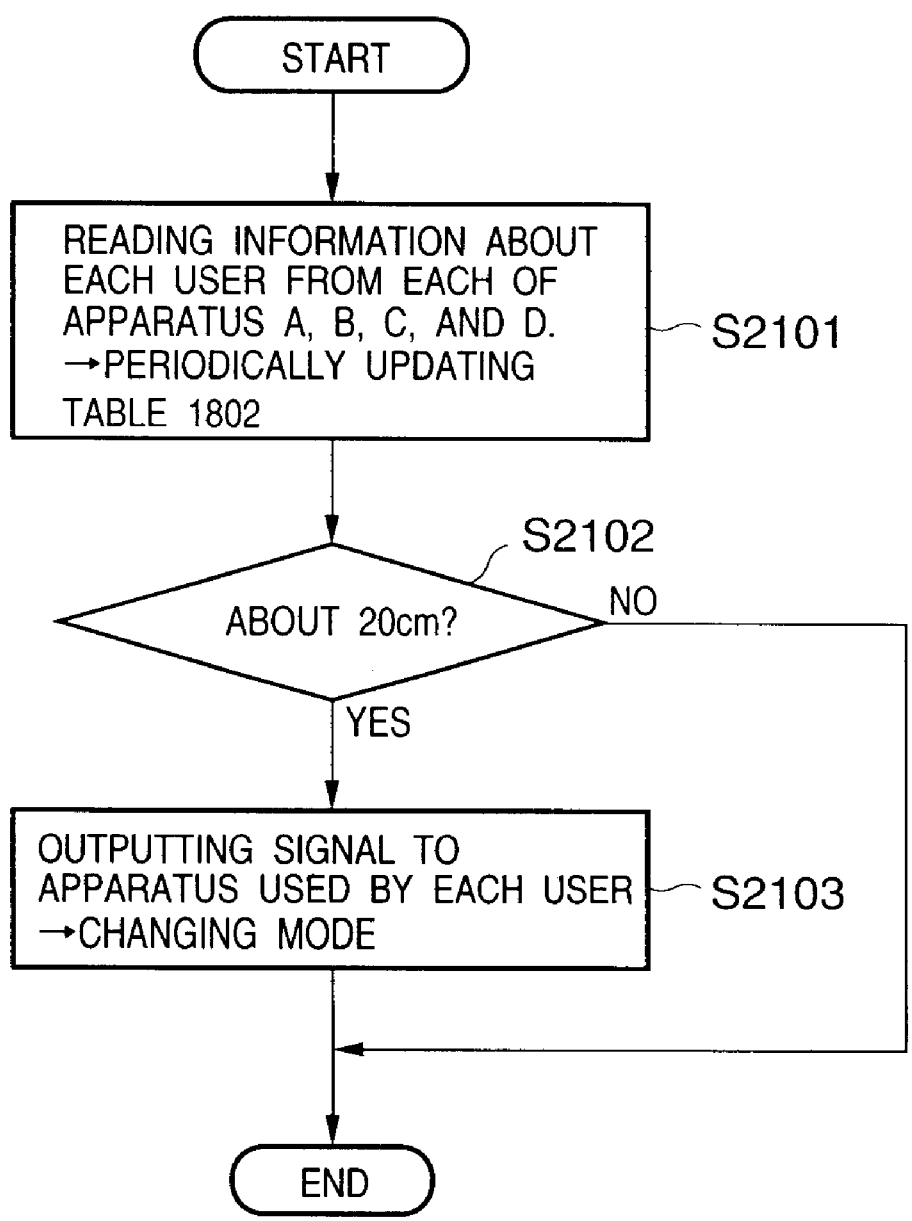
FIG. 21 is a flowchart of the process performed by a server 1801 when pets are exchanged.

The process performed by the server 1801 when the above mentioned pet exchanging operation is performed is described below by referring to FIG. 21 showing the flowchart of the process. The program code shown in the flowchart shown in FIG. 21 is stored in the RAM 1806, and read out and executed by the CPU 1803.

The server 1801 constantly reads the information about each user (the position and posture of the head, the position and posture of the hand) from the apparatus used by each user, and periodically updates the table 1802 (step S2101). Then, as described above, the two users whose hands are apart by about 20 cm are searched for according to the table 1802 (the column 1802d in which the status of the hands is described). If there are two users whose hands are apart by about 20 cm (step S2102), then the above mentioned mode change signal is output to the apparatuses used by these users (step S2103).

Figure 20:
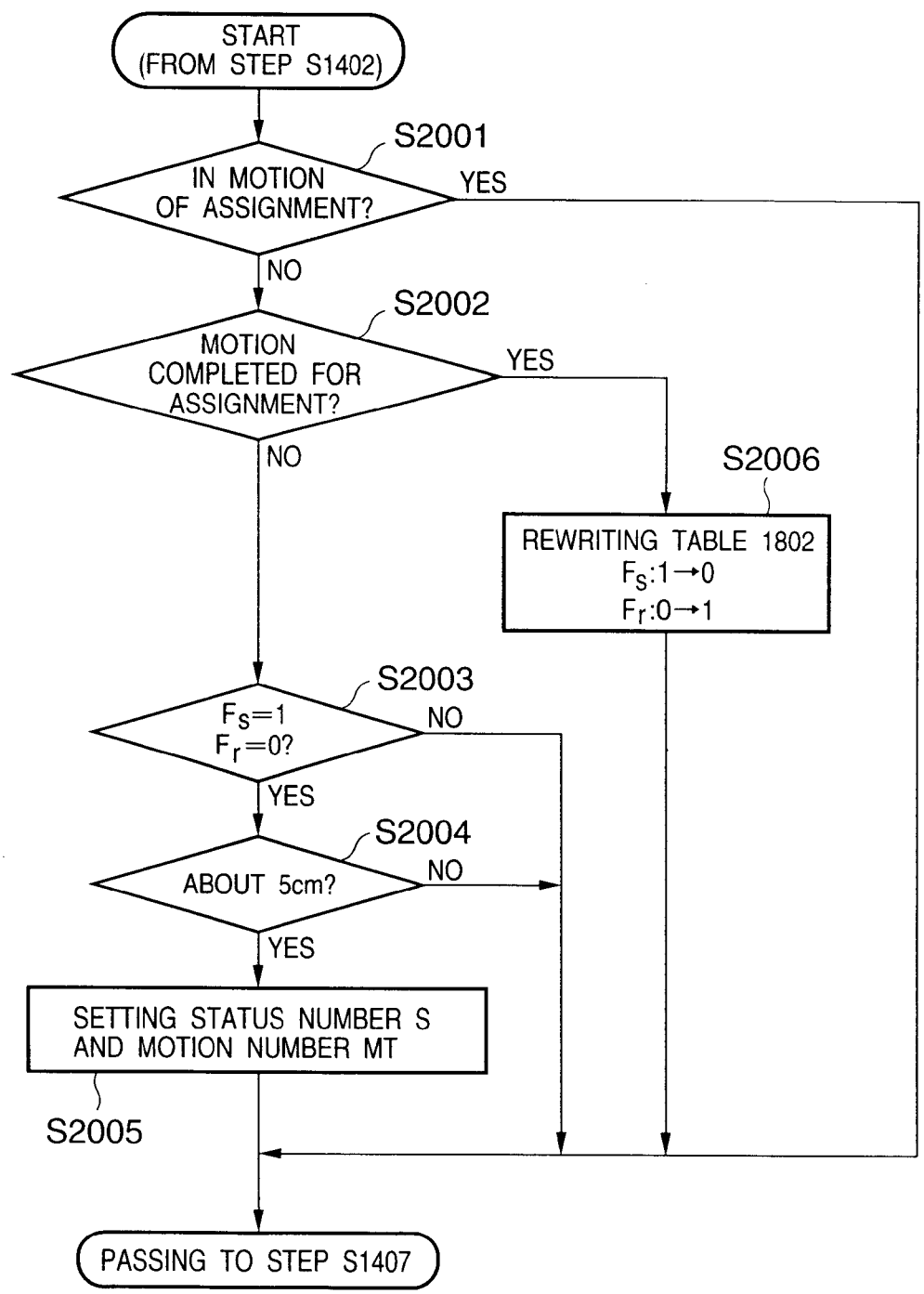
FIG. 20 is a flowchart of the process performed by the compound reality presentation apparatus of the user B when pets are exchanged.

According to the flowchart shown in FIG. 14 as the flowchart of the process mainly performed by the compound reality presentation apparatus (the apparatus used by the user B in the above mentioned example) according to this embodiment, furthermore, the operation mode of the compound reality presentation apparatus is set as the normal mode (in which the process according to the flowchart shown in FIG. 14 is performed) in step S1401. In the process after step S1402, it is determined whether or not the operation mode is the pet exchange mode. If it is the pet exchange mode, control is passed to the flowchart shown in FIG. 20. In FIG. 20, the possession flag of the user B is referred to as Fs, and the possession flag of the user C is referred to as Fr.

In FIG. 20, it is first determined whether or not the dolphin is in the motion of jumping into the position of the hand of the user C (step S2001). If it is not in the motion, then it is determined whether or not the dolphin has just finished the motion of jumping into the position of the hand of the user C (step S2002). If it is determined that the motion has not been completed yet, that is, the dolphin has not been transferred, then the table 1802 is referred to, and the possession flags of the users B and C are confirmed. That is, it is determined whether or not Fs (possession flag of the user B) is 1, and Fr (possession flag of the user C) is 0 (step S2003).

Then, it is determined whether or not the position of the hand of the user B is about 5 cm above the position of the hand of the user C (step S2004). If yes, then the status number S and the motion number MT of the dolphin are set (in the example above, S=50 and the motion number corresponding thereto) (step S2005), and the process is passed to step S1407. That is, the motion corresponding to the set motion number is performed.

When it is determined in step S2002 that the motion has terminated, the possession flags Fs and Fr described in the table 1802 stored in the server 1801 are rewritten. That is, Fs: 1→0, and Fr: 0→1 (step S2006).

The program code according to the flowchart (including FIG. 20) according to this embodiment is stored in the RAM 112 (or in the ROM 111), and read out and executed by the CPU 101.

With the above mentioned configuration, the system according to this embodiment allows a plurality of users not only to feel the compound reality in which the users communicate with dolphins, but also to view each other's dolphin among the users, and exchange dolphins. In addition, the data of a table, etc. which may occupy a large capacity in the memory can be stored in the server, thereby reducing the requirements for the memory of each compound reality presentation apparatus.

[Other Embodiments]

The purpose of the present invention can also be attained by providing a storage medium (or a recording medium) storing a program code of software for realizing the function of the above mentioned embodiment for a system or an apparatus, and reading and executing by the computer (or the CPU and the MPU) of the system and the apparatus the program code stored in the storage medium. In this case, the function of the above mentioned embodiment is realized by the program code read from the storage medium, and the storage medium storing the program code configures the present invention. Furthermore, by executing the program code read by the computer, not only the function according to the above mentioned embodiment can be realized, but also according to the instructions of the program code, the operating system (OS), etc. operating in the computer at an instruction of the program code performs a part or all of the actual process, and the function of the above mentioned embodiment can be realized in the process.

Furthermore, after the program code read from the storage medium is written to the memory of a function extending card inserted in the computer or a function extending unit connected to the computer, the CPU, etc. in the function extending card or the function extending unit performs a part or all of the actual process according to the instructions of the program code, and the function of the above mentioned embodiment can be realized by the process.

When the present invention is applied to the above mentioned storage medium, the storage medium stores the program code corresponding to the above mentioned flowcharts (shown in FIGS. 14 to 17) and/or the flowcharts including FIG. 20 described by referring to the third embodiment.

As described above, according to the present invention, the reality of a virtual object can be easily recognized by changing the status of the virtual object by a predetermined movement of a predetermined portion of the body of a user.

As many apparently widely different embodiments of the present invention can be made without departing from the spirit and scope thereof, it is to be understood that the invention is not limited to the specific embodiments thereof except as defined in the appended claims.

What is claimed is:

1. A compound reality presentation apparatus which generates an image of a virtual object, superposes the image on real space, and presents a result to a user, comprising:
   storage means for storing motion data of the virtual object;
   a table for indicating motion data associated with internal status of the virtual object;
   measurement means for measuring a position and a posture of a predetermined portion of a body of a user;
   detection means for detecting a predetermined movement of the predetermined portion of the body based on the measurement result of said measurement means;
   change means for changing a first internal status of the virtual object into a second internal status based on the detection result of said detection means and the first internal status;
   generation means for referring to the table to determine which motion data corresponds to the second internal status, reading the motion data from said storage means which corresponds to the second internal status, and generating an image of the virtual object according to the read motion data; and
   superposing means for superposing, on real space, the generated image of the virtual object.

2. The compound reality presentation apparatus according to claim 1, further comprising:
   capture means for capturing an image of real space.

3. The compound reality presentation apparatus according to claim 1, further comprising
   management means for managing the predetermined movement of the predetermined portion of the body associated with the information about the status change of the virtual object, wherein
      said change means changes the status of the virtual object by referring to the information, which is managed by said management means, about a status change of the virtual object corresponding to the predetermined movement by the predetermined portion of the body.

4. The compound reality presentation apparatus according to claim 1, further comprising
   contents storage means for storing the information about contents issued by the virtual object, wherein
      said change means selects information corresponding to a state of the virtual object from the information stored in said contents storage means when a status of the virtual object is changed.

5. The compound reality presentation apparatus according to claim 4, wherein
   said information about the contents issued by the virtual object contains either data of voice indicating the contents, or data of a character indicating the contents.

6. A compound reality presentation method for presenting compound reality after generating an image of a virtual object, superposing the image on real space, and presenting a result to a user, comprising:
   a storage step of storing motion data of the virtual object in a storage means;
   a table for indicating motion data associated with internal status of the virtual object;
   a measuring step of measuring a position and a posture of a predetermined portion of a body of a user;
   a detecting step of detecting a predetermined movement of the predetermined portion of the body based on the measurement result of said measuring step;
   a changing step of changing a first internal status of the virtual object into a second internal status based on the detection result of said detecting step and the first internal status;
   a generation step of referring to the table to determine which motion data corresponds to the second internal status, reading the motion data from said storage means which corresponds to the second internal status, and generating an image of the virtual according to the read motion data; and
   a superposing step of superposing, on real space, the generated image of the virtual object.

7. The compound reality presentation method according to claim 6, further comprising
   a managing step of managing the predetermined movement of the predetermined portion of the body associated with the information about the status change of the virtual object by the predetermined management means, wherein
      in said changing step, the status of the virtual object is changed by referring to the information, which is managed by the predetermined management means, about a status change of the virtual object corresponding to the predetermined movement by the predetermined portion of the body.

8. The compound reality presentation method according to claim 6, further comprising:
   a contents storing step of storing the information about contents issued by the virtual object in a predetermined storage means, wherein
      in said changing step, information corresponding to a state of the virtual object is selected from the information stored in the predetermined storage means when a status of the virtual object is changed.

9. A storage medium storing a program code for use in presenting compound reality after generating an image of a virtual object, superposing the image on real space, and presenting a result to a user, comprising:
   a program code of a storage step of storing motion data of the virtual object in the storage means;
   a table for indicating motion data associated with internal status of the virtual object;
   a program code of a measuring step of measuring a position and a posture of a predetermined portion of a body of a user;

a program code of a detecting step of detecting a predetermined movement of the predetermined portion of the body based on the measurement result of said measuring step;

a program code of a changing step of changing a first internal status of the virtual object into a second internal status based on the detection result of said detecting step and the first internal status;

a program code of a generation step of referring to the table to determine which motion data corresponds to the second internal status, reading the motion data from said storage means, which corresponds to the second internal status, and generating an image of the virtual object according to the read motion data; and a program code of a superposing step of superposing, on real space, the generated image of the virtual object.

10. The storage medium according to claim 9, further comprising a program code of a managing step of managing the predetermined movement of the predetermined portion of the body associated with the information about the status change of the virtual object by the predetermined management means, wherein in said changing step, the status of the virtual object is changed by referring to the information, which is managed by the predetermined management means, about a status change of the virtual object corresponding to the predetermined movement by the predetermined portion of the body.

11. The storage medium according to claim 9, further comprising a program code of a contents storing step of storing the information about contents issued by the virtual object in a predetermined storage means, wherein in said changing step, information corresponding to a state of the virtual object is selected from the information stored in the predetermined in the predetermined storage means when a status of the virtual object is changed.

12. A compound reality presentation apparatus which generates an image of a virtual object, superposes the image on real space, and presents a result to a user, comprising:

a storage unit adapted to store motion data of the virtual object;

a table for indicating motion data associated with internal status of the virtual object;

a measurement unit adapted to measure a position and a posture of a predetermined portion of a body of a user;

a detection unit adapted to detect a predetermined movement of the predetermined portion of the body based on the measurement result of said measurement unit;

a change unit adapted to change a first internal status of the virtual object into a second internal status based on the detection result of said detection unit and the first internal status;

a generation unit adapted to refer to the table to determine which motion data corresponds to the second internal status, read the motion data from said storage unit which corresponds to the second internal status, and generate an image of the virtual object according to the read motion data; and a superposing unit adapted to superpose, on real space, the generated image of the virtual object.

* * * * *

UNITED STATES PATENT AND TRADEMARK OFFICE
CERTIFICATE OF CORRECTION

PATENT NO. : 6,685,566 B2
DATED : February 3, 2004
INVENTOR(S) : Ohshima

It is certified that error appears in the above-identified patent and that said Letters Patent is hereby corrected as shown below:

Column 2,
Line 12, "contains" should read -- that contains --.

Column 5,
Line 14, "user," should read -- user. --.

Column 10,
Line 24, "E (threshold)" should read -- ∈ (threshold) --.

Column 11,
Line 22, "generate" should read -- generated --.

Column 15,
Line 53, "control" should read -- controls --; and
Line 62, "driver, program code," should read -- drivers, program codes, --.

Column 20,
Line 30, "virtual" should read -- virtual object --.

Column 22,
Line 3, "in the predetermined" should be deleted.

Signed and Sealed this

Ninth Day of November, 2004

JON W. DUDAS
*Director of the United States Patent and Trademark Office*